US009423665B2

(12) United States Patent
Lin et al.

(10) Patent No.: US 9,423,665 B2
(45) Date of Patent: Aug. 23, 2016

(54) AMBIENT LIGHT ADJUSTMENT APPARATUS, METHOD AND SYSTEM

(71) Applicant: Industrial Technology Research Institute, Hsinchu (TW)

(72) Inventors: Hsueh-Chin Lin, Taipei (TW); Yi-Shou Tsai, Taipei (TW); Chih-Chia Chang, Hsinchu County (TW); Wei-Chen Pao, Hsinchu County (TW); Kuo-Chung Huang, Taichung (TW); Ya-Hui Lin, Hsinchu (TW); Man-Chun Chu, Chiayi County (TW); Louis Lu-Chen Hsu, Taipei (TW)

(73) Assignee: Industrial Technology Research Institute, Hsinchi (TW)

( * ) Notice: Subject to any disclaimer, the term of this patent is extended or adjusted under 35 U.S.C. 154(b) by 123 days.

(21) Appl. No.: 14/222,693

(22) Filed: Mar. 24, 2014

(65) Prior Publication Data
US 2015/0268529 A1 Sep. 24, 2015

(51) Int. Cl.
*G02F 1/153* (2006.01)
*G02F 1/163* (2006.01)
*G02B 26/00* (2006.01)
(Continued)

(52) U.S. Cl.
CPC .................. *G02F 1/163* (2013.01); *E06B 7/00* (2013.01); *E06B 9/24* (2013.01); *G02B 26/005* (2013.01); *G02F 1/157* (2013.01); *E06B 2009/2464* (2013.01); *Y10T 29/49002* (2015.01)

(58) Field of Classification Search
CPC ....... G02F 1/163; G02F 1/157; G02B 26/02; E06B 7/00; E06B 9/24; E06B 2009/247; E06B 2009/2464
See application file for complete search history.

(56) References Cited

U.S. PATENT DOCUMENTS 6,212,805 B1   4/2001   Hill
6,398,370 B1   6/2002   Chiu et al.
(Continued)

FOREIGN PATENT DOCUMENTS

CA     2190969      12/1995
CN     101541120    9/2009
(Continued)

OTHER PUBLICATIONS

Marie-Claude Dubois et al., "Energy saving potential and strategies for electric lighting in future North European, low energy office buildings: A literature review", Energy and Buildings, Oct. 1, 2011, pp. 2572-2582,vol. 43, Issue 10.
(Continued)

*Primary Examiner* — Joseph P Martinez
(74) *Attorney, Agent, or Firm* — Jianq Chyun IP Office

(57) ABSTRACT

An ambient light adjustment (ALA) apparatus, a method and a system therewith are proposed. The ALA apparatus includes a main body having a plurality of edges, one or more light sources, a light blocking layer and a controller. The light source is mounted on at least one edge of the ALA apparatus. The main body comprises at least one light guide plate. The light blocking layer is disposed over a surface of the main body. The controller is coupled to the light source and the light blocking layer. The ALA apparatus further comprises at least one sensor coupled to the controller. The controller controls the light characteristics of the light source and/or the light blockage levels of the light blocking layer to adjust ambient light characteristics, according to a sensed result by the sensor or sensors.

30 Claims, 25 Drawing Sheets

(51) Int. Cl.
   *G02F 1/157* (2006.01)
   *E06B 7/00* (2006.01)
   *E06B 9/24* (2006.01)

(56) References Cited

U.S. PATENT DOCUMENTS

| | | | |
|---|---|---|---|
| 7,198,372 | B2 | 4/2007 | Aeling et al. |
| 7,505,188 | B2 | 3/2009 | Niiyama et al. |
| 8,232,958 | B2 | 7/2012 | Tolbert |
| 8,292,467 | B2 | 10/2012 | Vissenberg et al. |
| 2012/0113682 | A1 | 5/2012 | Morino et al. |
| 2012/0127701 | A1 | 5/2012 | Brydon, Jr. |
| 2012/0239209 | A1 | 9/2012 | Brown et al. |
| 2012/0306381 | A1 | 12/2012 | Adler |
| 2012/0307522 | A1 | 12/2012 | Ham |
| 2013/0026504 | A1 | 1/2013 | Marx et al. |
| 2013/0242370 | A1 | 9/2013 | Wang |
| 2014/0185129 | A1* | 7/2014 | Kim .................. H01L 51/5284 359/296 |

FOREIGN PATENT DOCUMENTS

| | | |
|---|---|---|
| EP | 0703561 | 3/1996 |
| EP | 1739473 | 1/2007 |
| TW | M344266 | 11/2008 |
| TW | M438092 | 9/2012 |
| WO | 2013019080 | 2/2013 |
| WO | 2013127212 | 9/2013 |
| WO | 2013148124 | 10/2013 |

OTHER PUBLICATIONS

Edmonds et al., "Daylighting in the tropics", Solar Energy, Aug. 2, 2008, pp. 111-121, vol. 73, Issue 2.

Gordon et al., "Large area electrochromics for architectural applications", Journal of Non-Crystalline Solids, Sep. 2, 1997, pp. 342-346, vol. 218.

Wen et al., "Towards embedded wireless-networked intelligent daylighting systems for commercial buildings", IEEE International Conference on Sensor Networks, Ubiquitous, and Trustworthy Computing, Jun. 5-7, 2006, pp. 1-6.

Bhardwaj et al., "Smart lighting using LED luminaries", 2010 8th IEEE International Conference on Pervasive Computing and Communications Workshops (PERCOM Workshops), Mar. 29, 2010-Apr. 2, 2010, pp. 654-659.

* cited by examiner

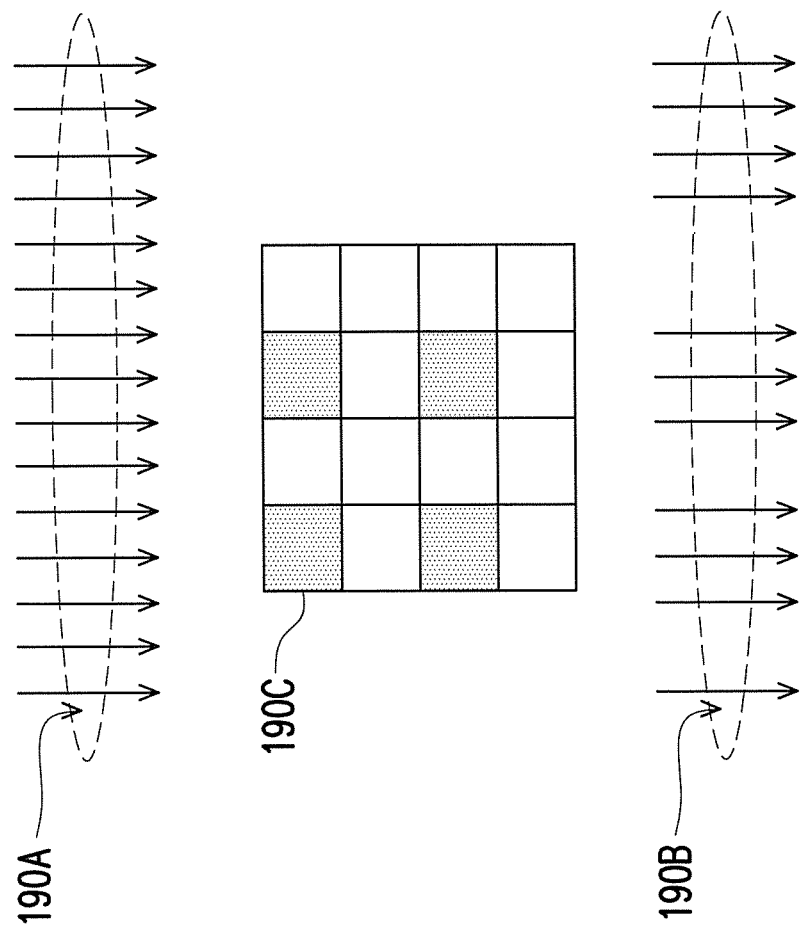

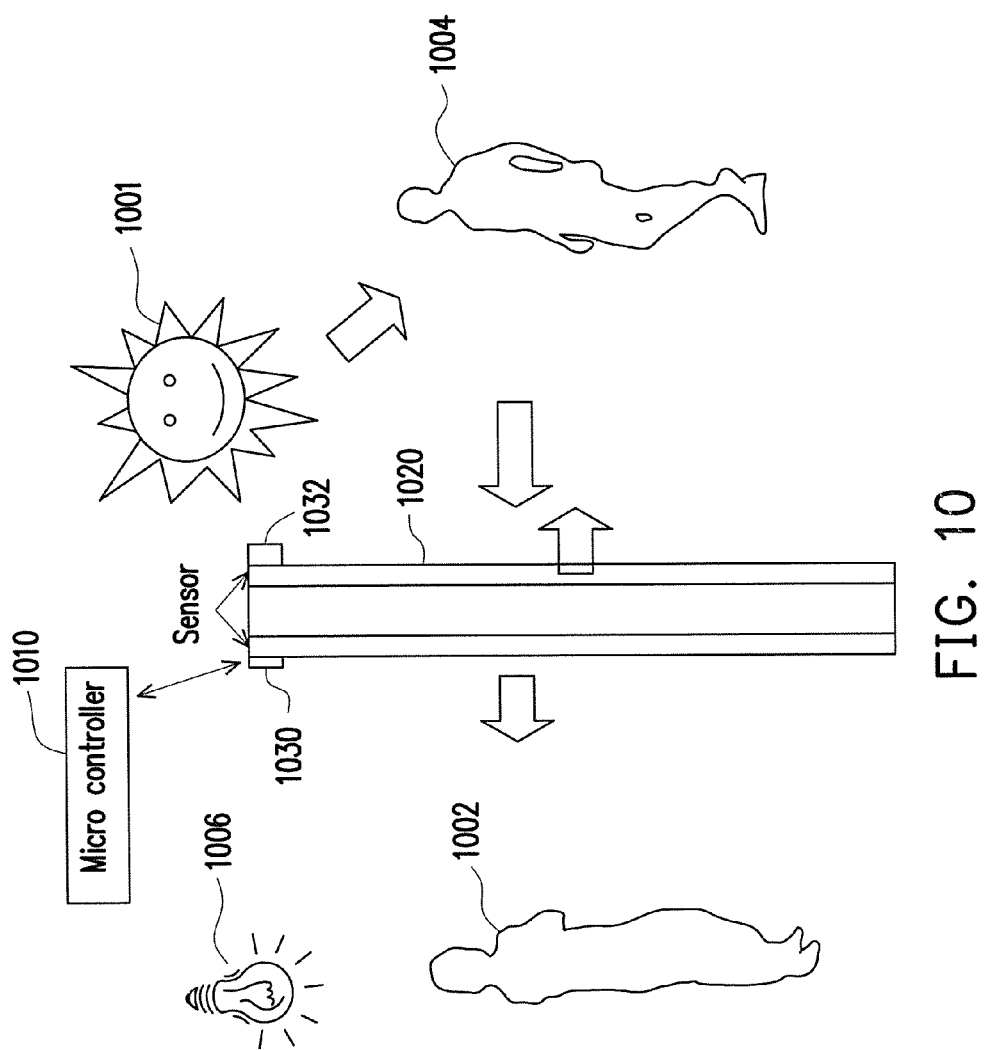

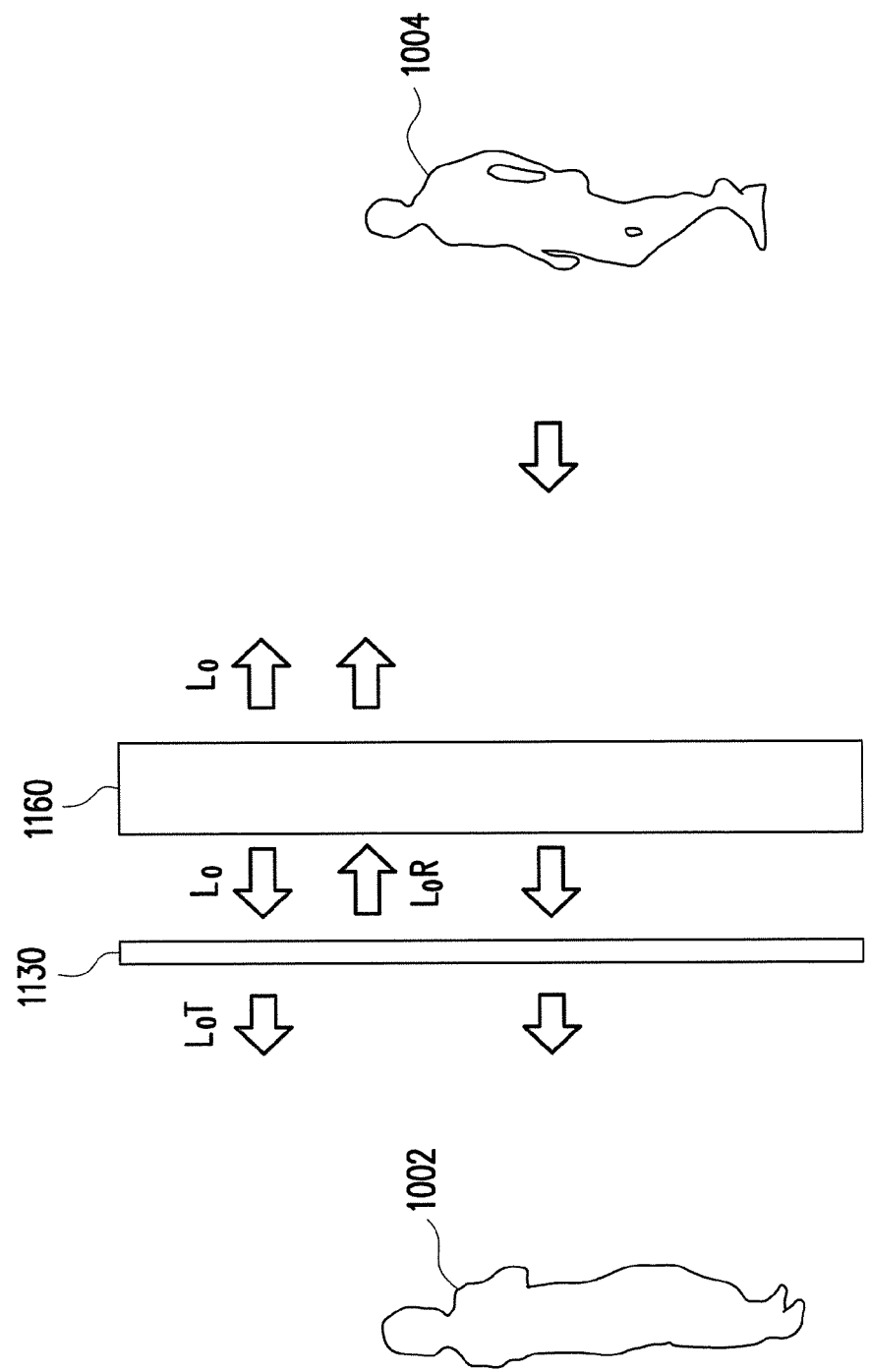

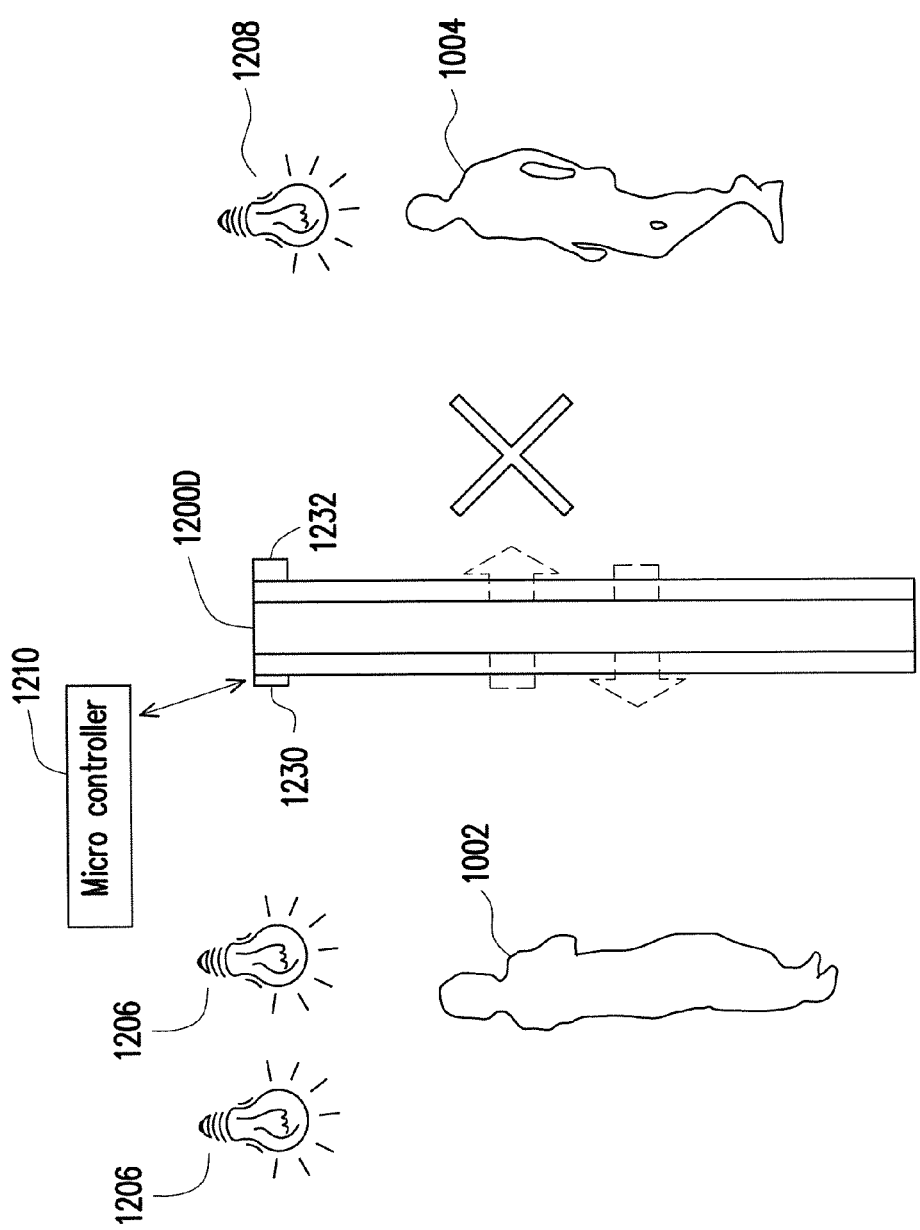

AMBIENT LIGHT ADJUSTMENT APPARATUS, METHOD AND SYSTEM

TECHNICAL FIELD

The disclosure generally relates to an apparatus, a method and a system of adjusting ambient light, more particularly, a smart window with ambient light adjustment capability.

BACKGROUND

Some existing displays are made of a light guide with edge light sources. However, almost all the displays are not transparent enough for window applications. A smart window available today is able for transparency adjustment. The smart window can thus save energy by blocking external heat in the summer time. Some of them are also able for serving as a display. It can be used as a curtain for shielding and preventing outsiders peeking in. However, when the smart window is in its blocking mode, it is not possible for an insider to see out. It is neither able to adjust ambient light when outdoor light intensity is sufficient or insufficient. Therefore, there is a need to design a smart window, or an intelligent, multifunction ambient light adjustment apparatus to overcome the above mentioned shortcomings.

SUMMARY

One of exemplary embodiments comprises an ambient light adjustment (hereon called ALA) apparatus. The ALA apparatus comprises a main body having a plurality of edges, at least one light source, a light blocking layer and a controller. In the ALA apparatus, the light source is mounted on at least one of the plurality of edges of the main body. The light blocking layer is disposed over a surface of the main body. The controller is coupled to the light source and the light blocking layer. The controller controls light characteristics, e.g. intensity, wavelength, polarization and/or colour temperature of the light source and/or light blockage levels of the light blocking layer to achieve the goals of ambient light adjustment.

In one of exemplary embodiments, a system for adjusting indoor ambient light characteristics is proposed. The system comprises at least one indoor ALA apparatus. The ALA apparatus mentioned above further comprises at least one light guide plate. The controller can be set with at least one pre-set program, and the controller adjusts the light characteristics of the light source and/or light blockage levels of the light blocking layer based on the pre-set program, thereby the indoor ambient light characteristics are adjusted accordingly.

In one of exemplary embodiments, a method for an ALA apparatus to adjust indoor ambient light characteristics is proposed. The method of operating the ALA apparatus as mentioned above comprises following steps: sensing indoor light characteristics; comparing the sensed indoor light characteristics with a pre-set threshold; and adjusting the indoor ambient light characteristics based on the at least one pre-set threshold. The last step further comprises at least one of the following steps: adjusting a degree of blockage of the light blocking layer; adjusting light characteristics of the light source; and/or adjusting light characteristics of an indoor light source.

In one of exemplary embodiments, a method for fabricating an ALA apparatus mentioned above is also proposed. It comprises following steps: preparing a main body having a plurality of edges with at least one light guide plate; disposing a light blocking layer on a surface of the light guide plate; attaching at least one light source element along at least one edge of the light guide plate; installing a controller and coupling it to the light source element and the light blocking layer.

More exemplary embodiments accompanied with figures are described in detail below in the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1B schematically illustrates a decodable light blocking layer for a light blocking layer by programming spaces, frequencies and degrees of light blockage in one of exemplary embodiments.

FIG. 10 schematically illustrates a blocking view example by using in an ALA apparatus of one of exemplary embodiments of the disclosure.

FIG. 11 schematically illustrates a calculation of signal/noise (S/N) ratio in an ALA apparatus of one of exemplary embodiments of the disclosure.

FIG. 12A through FIG. 12D schematically illustrate various modes that an ALA apparatus being served in one of exemplary embodiments of the disclosure.

DETAILED DESCRIPTION

Figure 1A:
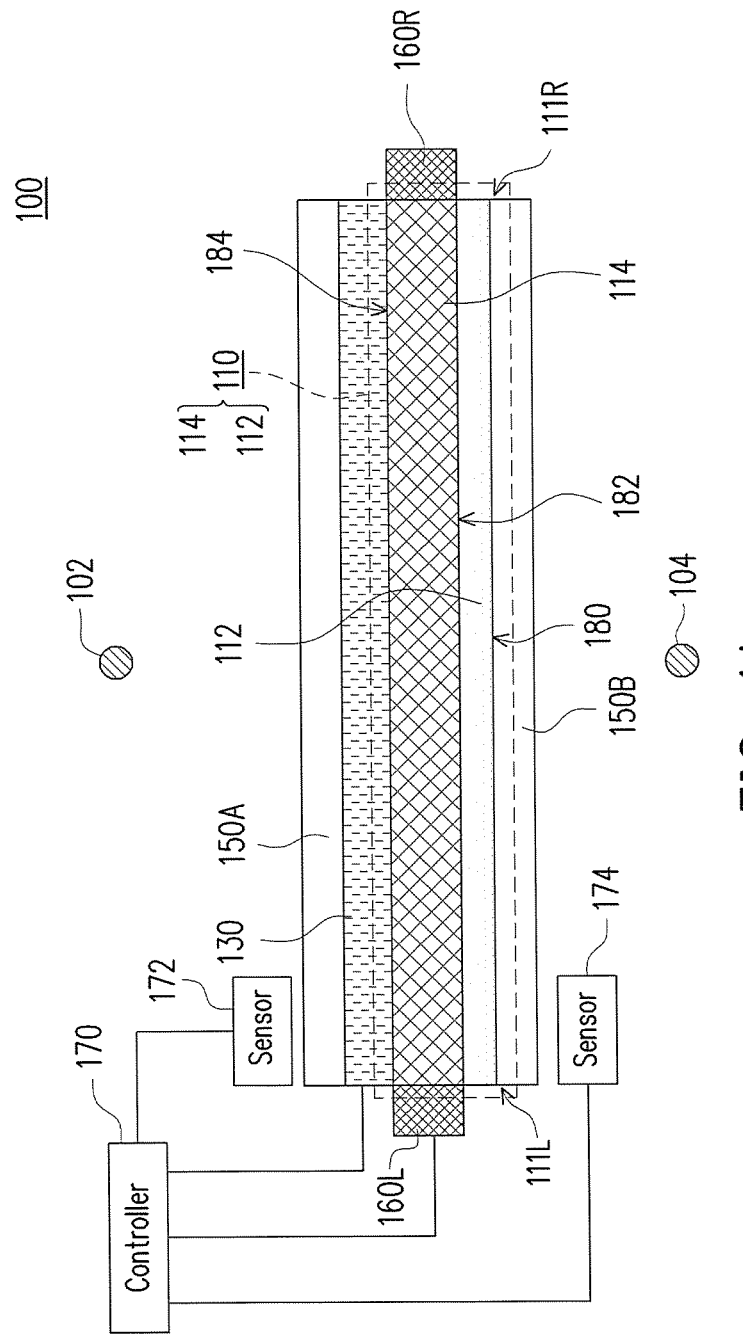
FIG. 1A schematically illustrates an ALA apparatus in one of exemplary embodiments.

The disclosure generally relates to an apparatus, a method or a system of adjusting ambient light. In one of exemplary embodiments, a smart window with ALA capability is disclosed.

In one of exemplary embodiments, the ALA apparatus comprises a main body having a plurality of edges, at least one light source, a light blocking layer and a controller. In the ALA apparatus, the light source is mounted on at least one of the plurality of edges of the main body. The main body comprises at least one light guide plate. The light blocking layer is disposed over the first surface of the main body. The controller is coupled to the light source and the light blocking layer. The controller controls light characteristics of the light source and/or light blockage levels of the light blocking layer to adjust ambient light characteristics. The aforesaid light characteristics comprise light intensity, light wavelength, light polarization and/or light colour temperature. The ALA apparatus further comprises at least one or more sensors coupled to the controller. The controller is configured to control the light characteristics of the light source and/or the light blockage levels of the light blocking layer according to a sensed result by the sensor or sensors.

In one of exemplary embodiments, a system for adjusting indoor ambient light characteristics is proposed. The system comprises an indoor ALA apparatus. The ALA apparatus comprises a main body having a plurality of edges, one or more light blocking layer, one or more light sources, and a controller. The main body further comprises at least one light guide plate. The controller is programmed with at least one pre-set threshold, and the controller adjusts light characteristics of the light source and/or light blockage levels of the light blocking layer based on the pre-set threshold, thereby the indoor ambient light characteristics are adjusted accordingly. The aforesaid light characteristics comprise light intensity, light wavelength, light polarization and/or light colour temperature.

For privacy and security purposes, a variety of proposals have been introduced, which are intended to avoid outsiders to peek inside a house through the smart windows. Traditionally, the privacy of the house is kept through installing shutters, curtains, blinds and/or other window blocking devices. One disadvantage is that people inside the house is also hard to see through the window when it is blocked. In one embodiment, an indoor ALA apparatus is proposed herein, in which at least within a certain view angle, the ALA apparatus can partially or entirely prevent an outsider to see through.

In another embodiment, a light blocking layer is introduced in the ALA apparatus or in the system, in which the light blocking layer is made decodable, so that it can block the view with different degrees of blockage. In one or some of exemplary embodiments of the disclosure, the light blocking layer can be manually or automatically adjusted through the controller or a remote control.

In one or some of exemplary embodiments of the disclosure, the light blocking layer can be programmed for displaying a pre-set pattern.

In the same embodiment or in other embodiment, light characteristics of a light source attached to the ALA apparatus or the ALA apparatus in the system may be adjusted for blocking the view between the indoor position and the outdoor position.

In one embodiment of the ALA system, one or more programs stored in a memory unit are configured to be executed by the controller for performing sensing indoor light characteristics; comparing the sensed indoor light characteristics with a pre-set threshold; adjusting indoor light characteristics based on the comparison; and further conducting at least one of following steps: tuning the blockage of the light blocking layer; adjusting the light characteristics of the light source; and/or adjusting indoor light characteristics.

In one of exemplary embodiments, an operating method for an ALA apparatus to adjust indoor ambient light characteristics is proposed. The method comprises following steps: sensing indoor light characteristics; comparing the sensed indoor light characteristics with a pre-set threshold; and adjusting the indoor ambient light characteristics based on the at least one pre-set threshold by performing at least one of the following steps: adjusting a degree of blockage of the light blocking layer partially or entirely; adjusting light characteristics of the light source; and/or adjusting light characteristics of an indoor light source.

In one of exemplary embodiments, a method for fabricating an ALA apparatus is proposed. The method comprises following steps: preparing a main body having a plurality of edges with a light guide plate; disposing a light blocking layer on a surface of the light guide plate; attaching at least one light source element along at least one edge of the light guide plate; installing a controller which is coupled to the at least one light source element and the light blocking layer.

In one of exemplary embodiments of the method for fabricating the ALA apparatus, the light blocking layer is a prefabricated light blocking layer which is attached to the light guide plate. In one of exemplary embodiments of the method for fabricating the ALA apparatus, the light blocking layer is fabricated sequentially by: forming a first transparent conductive electrode; forming an electro-chromatic stack layer on the first transparent conductive electrode; and forming a second transparent conductive electrode on the surface of electro-chromatic stack layer. In one of exemplary embodiments of the method for fabricating the ALA apparatus, a diffusion layer is formed on a surface of the light guide plate.

Reference will now be made in detail to some embodiments of the disclosure, examples of which are illustrated in the accompanying drawings, but not limited thereto. Wherever possible, the same reference numbers are used in the drawings and the description to refer to the same or like parts.

Please refer to FIG. 1A, which schematically illustrates an ALA apparatus in one of exemplary embodiments. The ALA apparatus 100 comprises at least a main body 110 (Dashbox), a light blocking layer 130, a plurality of light sources 160 (at least one left light sources 160L and/or one right light source 160R on the edge of the main body 110, for example) and a controller 170. The main body 110 has a plurality of edges 111. The plurality of light sources, for example, the light sources 160L and/or 160R are respectively mounted on at least one of the plurality of edges (such as 111L and 111R depicted in FIG. 1A) of the main body 110. The light blocking layer 130 is disposed over or on a top surface 184 of the main body 110 (dash box, as shown). The controller 170 is coupled to the light blocking layer 130 and the light sources 160L and/or 160R. The controller 170 controls light characteristics of the light sources 160L, 160R and degrees of light blockage of the light blocking layer 130 to adjust ambient light characteristics. In the embodiment, the main body 110 may be a transparent substrate (such as a polymer substrate). The surface of the main body may be patterned so as to guide and adjust the light from the light sources 160. The surface patterning methods may include thermal pressing, imprinting, laser or surface plasmon resonance (SPR). For example, in the surface plasmon resonance process, nanoparticles including Silver (Ag), Gold (Au) and Copper (Cu) may be firstly embedded in the polymer substrate via a physical or chemical manner, in which the aforementioned metal nano-particles may have various absorption bands, for example, Silver has the absorption band of 400 nm-450 nm, Gold has the absorption band of 500 nm-550 nm and Cooper has the absorption band of 580 nm-650 nm. Then, a laser beam is selected to irradiate on the polymer substrate embedded with metal nano-particles, such that the metal nano-particles absorbed heat from laser beam and locally melt away the surface of the polymer substrate. Afterwards, the remaining nanoparticles are removed which results in the polymer substrate with a roughened surface. Alternatively, even smaller nanoparticles may be employed and which are deformed after being irradiated by laser. As such, the nanoparticles are remained on the surface of the polymer substrate to create a polymer substrate with a roughened surface. In other words, a rough surface of the substrate, may be obtained through the two examples mentioned above, which improves the efficiency of light guidance.

In one of exemplary embodiments, the main body 110 comprises a light guide plate 114. The material of the light guide plate comprises acrylic resin, polycarbonate, epoxy, glass, polyeolefin (polyester, PMMA, PET, PP, PE), cyclo olefin polymer (COP), polycarbonate (PC), ABS, Epoxy, polyester, polysulfone, cellulose triacetate, polycarbonate, polyimide, polystyrene, or polymethylpentene. The light guide plate 114 may also be made of other transparent materials, for example, a light transmissive material (such as a transparent resin or a transparent glass). The light guide plate 114 may also be made of, for example, polyethylene, polypropylene, cyclo olefin polymer, polystyrene, polyacrylonitrile, polymethyl methacrylate, polyamide, polycarbonate, polyethylene terephthalate, polybutylene terephthalate, polyethylene naphthalene, or triacetyl cellulose, bisphenol fluorene derivatives or combination thereof, which may be used for the transparent plate. Besides, the light guide plate 114 may also be doped with inorganic particles or metal particles such as $SiO_2$, SiO, $TiO_2$, $ZrO_2$, $Al_2O_3$, ZnS, $Si_3N_4$, $MgF_2$, which the content of the afore-described particles may be within 30 wt % in the polymer substance, for instance.

In another embodiment, the light guide plate 114 may be embedded with high refractive index particles such as $SiO_2$, SiO, $TiO_2$, $ZrO_2$, $Al_2O_3$, ZnS, $Si_3N_4$ or $MgF_2$, so as to have a desired refractive index for the light guide plate 114. For example, the refractive index values of the light guide plate 114 may be distributed in a ladder manner. Specifically, the particles with various refractive indexes are added during multi-stage (or at least two-stage) polymerization to form such light guide plate 114. The solid content concentration of these particles is varied along a thickness direction of the light guide plate 114, so as to result in a laddered (or gradient) variation of the refractive index values of the light guide plate 114.

Generally, two kinds of diffusion layer are disclosed here. One is to embed such layer inside or on the surface of the light guide material, the other one is to form or coat a diffusion layer with a specific refractive index on the surface of the light guide plate. Therefore, in this disclosure, either way can be used. Details of these method and material are described in the following sessions.

In one embodiment, a first surface 182 of the light guide plate 114 may be modified for example imprinted with light diffusible particles to have a desired refractive index. The refractive index of light guide plate 114 may be in a range from about 1.2 to about 2.5. The size of the diffusible particles is in a range from about 0.01 um to about 10 um. The materials of light diffusible particles are selected from the group consisting of $SiO_2$, SiO, $TiO_2$, $ZrO_2$, $Al_2O_3$, ZnS, $Si_3N_4$, $MgF_2$, or combination thereof.

In one embodiment, the main body 110 further comprises at least one diffusion layer 112 formed on the first surface 182 of the light guide plate 114. The diffusion layer 112 can be a self-assembled monolayer, a particle-embedded layer, a micro-machined structure layer or a printed dot-pattern layer, for example. For example, the self-assembled monolayer (SAM) is organic molecules which are molecular assembly formed spontaneously on surfaces by adsorption and are organized into more or less large ordered domains.

A self-assembly monolayer may be formed on a base material (the first surface 182 of the light guide plate 114). The self-assembly monolayer may be bonded with the modified particles. The self-assembly monolayer may also be formed on a bonding layer. A material for the self-assembly monolayer may have a head group and functional-end group. In such material, the head group may be connected to an alkyl chain, in which another end of the head group without connecting to the alkyl chain may be functionalised (that is, adding the groups of —OH, —NH 3 or —COOH), such that the wetness and the interfacial properties of the self-assembly monolayer may be varied. The functional-end group may be selected from —OH, —CHO, —COOH, —SH and —CONH2, although the disclosure is not limited thereto. The type of the head and end group depends on the usage of the self-assembly monolayer. A surface that the head and end group may be attached including a surface of a silicon wafer, a metal layer or a curved surface (for instance, a surface of a nano-particle). The material for the self-assembly monolayer may include alkanethiols, disulfides, dialkyl disulfides, dialkyl sulfides, alkylxanthates or dialkylthiocarbamates. The alkanethiol may be a molecule which has the alkyl chains serving as the skeleton, a terminal group (such as a S—H or O—H group) and a S—H head group. The alkanethiols may be applied to a noble metal substrate, this is due to sulphur has strong affinity towards such metal. For example, the material of the self-assembly monolayer may include HS—CnH2n-COOH (such as, HS—C3H6-COOH), HS(CH2) 16OH, HS(CH2) 15CO2CH3, HS(CH2) 15 CH3, HS(CH2) 15COOH, HS(CH2) 16SO4H, HS(CH2) 9CH3, NH 2 (CH 2)n SH, HS(CH2) 11CONH2 or Si(OCH3) 3-(CH2)nSH. The S—H head end group in the material forms covalent bonds with the modified particles, such that the particles are secured on the first surface 182 of the light guide plate 114 to form the diffusion layer 112. On the other hand, the particles may be distributed across the first surface 182 of the light guide plate 114 through selecting various self-assembly materials to form a patterned diffusion layer 112, in order to control the position of the light being emitted.

In the embodiment, when the diffusion layer 112 has been fabricated as described above (namely, the self-assembly monolayer being patterned), a protective layer 150B may be disposed on the surface of the diffusion layer 112 so as to protect the diffusion layer 112. With the use of the diffusion layer 112 in the ALA apparatus 100, the light can be prevented to be emitted out from the diffusion layer 112 side while transmitting in the light guide plate 114. In other words, a majority of light are emitted from the light blocking layer 130 side, so as to enhance the light utilization efficiency of the ALA apparatus 100.

Figure 7A:
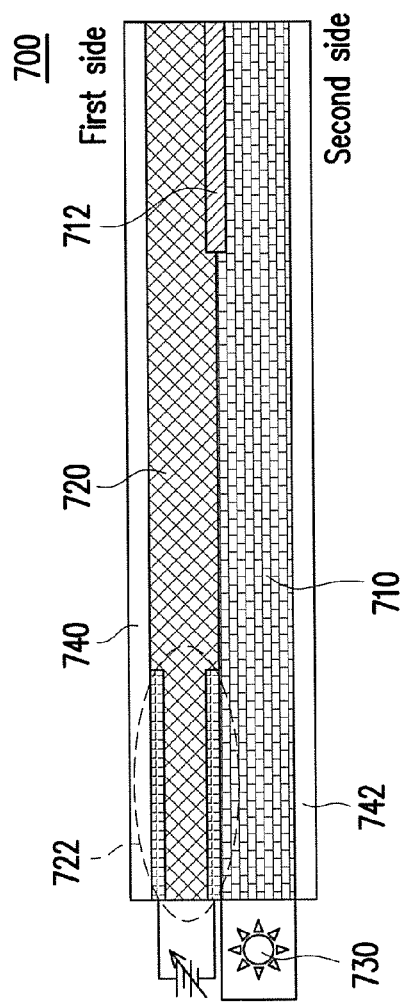
FIG. 7A and FIG. 7B schematically illustrate ALA apparatus in exemplary embodiments with light blocking layers comprising electro-chromatic layers.
Figure 7B:
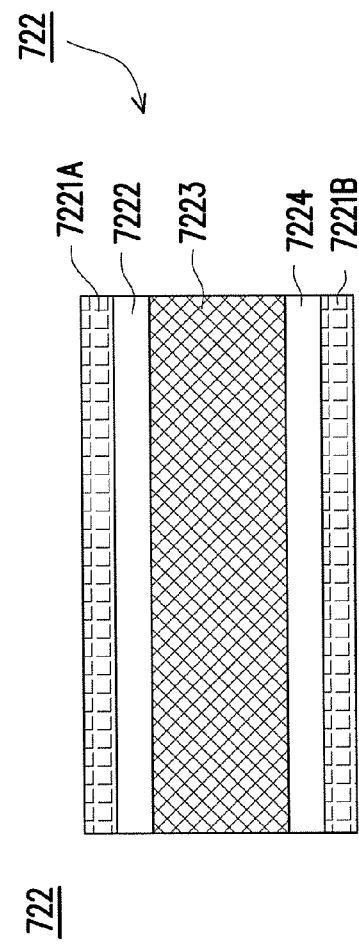

In one embodiment, the light blocking layer 130 may be a decodable light blocking layer 130 for programming spaces, frequencies and degrees of light blockage. That means that a pre-determined or pre-set pattern may be arranged by decoding in the light blocking layer 130, in which different areas or partitions thereof may have different degrees of light blockage. The light blocking layer 130 can comprise electro-chromatic layers or electro-wetting layers. In one embodiment, the light blocking layer 130 comprises a transparent conductive electrode, an electro-chromatic stack layer on the first transparent conductive electrode, and a second transparent conductive electrode on the electro-chromatic stack layer. The electro-chromatic stack layer comprises an electro-chromic (EC) layer, an ion conductor (IC) layer on the electro-chromic (EC) layer, and a counter electrode (CE) layer on the ion conductor (IC) layer. Detailed description of the structure of the light blocking layer is shown in FIGS. 7A and 7B.

In one embodiment, the light source 160L or the light source 160R may be an light emitting diode (LED) device, an electroluminescent (EL) light device, a light bulb, and a cold-cathode fluorescent lamp (CCFL). The light source 160L or the light source 160R may also be a multiple spectrum light source or a full-spectrum light. The full-spectrum light is a light that covers the electromagnetic spectrum from infrared to near-ultraviolet, or all wavelengths that are useful to plant or animal life.

In one of exemplary embodiments, the ALA apparatus 100 further comprises a protective layer 150A on a surface of the light blocking layer 130 opposing to another surface of the light blocking layer 130 facing the top surface 184 of the main body 110 (dash box, as shown). In other embodiment, the ALA apparatus 100 may further comprise another protective layer 150B on a bottom surface 180 of the main body 110 (dash box, as shown). The protective layer 150A or 150B may comprise materials of transparent organic, inorganic, hybrid materials, or a combination thereof. The transparency of the protective layer 150A or 150B is preferably to be greater than about 80%. The protective layer may be composed of organic material, inorganic material or hybrid material. The organic material for the protective layer may include polyeolefin (polyester, PMMA, PET, PP, PE), cyclo olefin polymer (COP), polycarbonate (PC), ABS, epoxy, polyester, polysulfone, cellulose triacetate, polycarbonate, polyimide, polystyrene, or polymethylpentene. The hybrid material for the protective layer may be hard-coated, so that the protective layer may be a monolayer or multi-layers.

When the protective layer is composed of a monolayer, such polymer layer is served as a matrix doped with an anti-UV agent (which can be categorized into physical absorption and reflection types, for instance), and a scratch-endurable antisolvent may be added into the matrix regarding hardness improvement, such as adding $SiO_2$, $TiO_2$, $ZrO_2$, CNT or carbon nanoparticles, $Al_2O_3$ and combination thereof. Besides, the design of the molecular structure of such polymer may also be employed, along with the use of scratch-endurable antisolvent, so as to improve the hardness of the protective layer. On the other hand, the vitex system may be referred when the protective layer is composed of multi-layers, in which one layer of the multi-layers may be an organic layer and another layer may be a stacked inorganic layer. For example, the multi-layers of the disclosure may be constituted by at least one organic layer and one inorganic layer, although the disclosure is not limited thereto. With the use of protective layer, the ALA apparatus 100 may become more tolerable, UV-resistible (such as, an anti UV agent), waterproof, anti scratch and anti corrosion, thereby extending the lifespan of the ALA apparatus 100 and increasing the reliability thereof.

In one of exemplary embodiments, the ALA apparatus 100 further comprises at least one 172 or more sensors 172 and 174 coupled to the controller 170. The controller 170 controlling the light characteristics of the light source and/or the light blockage levels of the light blocking layer 130 according to a sensed result by the sensor or sensors. Fore example, a sensor 172 may be disposed adjacent to the protective layer 150A facing a direction to an outdoor position 102, as shown in FIG. 1A. The sensor 172 may sense outdoor light characteristics and send the measured result therefrom to the controller 170. In other embodiment, the ALA apparatus 100 may further comprise another sensor 174 disposed adjacent to the protective layer 150B facing a direction to an indoor position 104. The sensor 174 may sense indoor light characteristics and send the measured result therefrom to the controller 170. The aforesaid light characteristics comprise light intensity, light wavelength, light polarization and/or light colour temperature. The sensor 172 and/or 174 may comprise a plurality of multiple spectrum sensing units, which may sense lights characteristics comprise light intensity, light wavelength, light polarization and/or light colour temperature with multiple spectrums. Optionally, the sensor 172 or 174 may be integrated into the controller 170.

Please refer to FIG. 1B for illustrating a decodable light blocking layer for a light blocking layer by programming the spaces, frequencies, and degrees of light blockage. The pre-determined or pre-set pattern 190C may be arranged by decoding in the light blocking layer 130, in which different areas or partitions thereof may have different spaces, frequencies and degrees of light blockage. The light 190A, no matter from the indoor position to the outdoor position or from the outdoor position to the indoor position, can be fully or partially blocked as desired, and the light 190A passing through the light blocking layer 130 is changed to the light 190B with the light characteristics with the pre-determined or pre-set pattern 190C.

Figure 2:
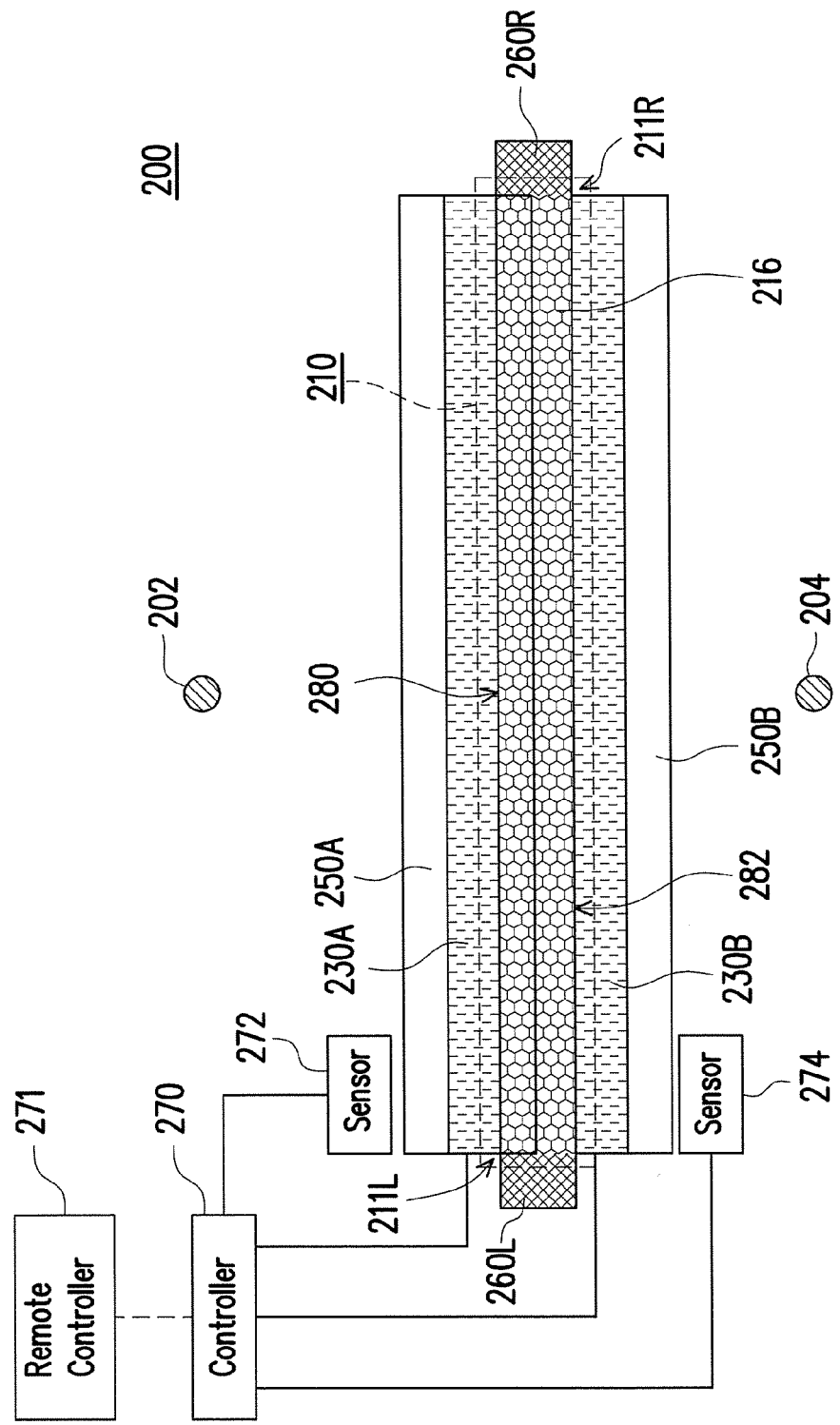
FIG. 2 schematically illustrates an ALA apparatus in another one of exemplary embodiments.

Please refer to FIG. 2, which schematically illustrates an ALA apparatus in another one of exemplary embodiments. The ALA apparatus 200 comprises a main body 210 sandwiched in between two light blocking layers (230A and 230B), light sources (260L and 260R) and controller (270). The two light blocking layers can be independently programmed to partially or entirely block the view between an indoor position and an outdoor position. In one or some of exemplary embodiments, either or both of the two light blocking layers is/are manually or automatically adjusted independently or correlated with each other through the controller, or a remote control 271. In one or some of exemplary embodiments of the disclosure, the light blocking layer can be programmed to be adjusted the light blockage levels for displaying a pre-set pattern. The two light blocking layers may be programmed according to the same or different pre-set pattern(s), or to have the same or different spaces, frequencies and degrees of light blockage. For more details, the ALA apparatus 200 comprises at least a main body 210 (dash box, as shown), two light blocking layers 230A and 230B, one or more light sources 260 (260L and 260R) and a controller 270. The ALA apparatus 200 further comprises a protective layer 250A disposed on the surface of light blocking layer 230A and another protective layer 250B disposed on the surface of the light blocking layer 230B. In one of exemplary embodiments, the ALA apparatus 200 further comprises two sensors 272 and 274 respectively disposed over the light blocking layer 230A facing an outdoor position 202 and the blocking layer 230B facing an indoor position 204. The two sensors 272 and 274, coupled to the controller 270, for sensing light characteristics respectively in an outdoor environment and in an indoor environment and send the measured results therefrom to the controller 270. The aforesaid light characteristics comprise light intensity, light wavelength, light polarization and/or light colour temperature.

It is understandable that a remote control can also be provided for user convenience to perform similar functions as those of the system controller mounted on the ALA apparatus. In this case, the ALA apparatus must be installed with a receiver to receive commands from the remote control and transmit the commands to the system controller mounted on the ALA apparatus. Such a remote control may comprise: (1) a power supply means, such as battery or battery set, for supplying power to the remote control; (2) a keyboard for inputting ALA apparatus control commands and setting parameters, such as thresholds, temperature, time, date, etc.; (3) a micro-control chip coupled to the keyboard and the power supply means for accepting the ALA apparatus control commands from the user; (4) a transmitter means coupled to said control means and said power supply means for transmitting the control signals to the ALA apparatus; and optionally; and (5) an animated ALA apparatus display coupled to the control means for displaying an animated pictorial representation of the ALA apparatus status.

The main body 210 has a plurality of edges (211L and 211R). The light sources 260L and 260R are respectively mounted on the edges 211L and 211R of the main body 210. The light blocking layer 230A is disposed over or on a first surface 280 of the main body 210, and the other light blocking layer 230B is disposed over or on a second surface 282 of the main body 210. The controller 270 is coupled to the light blocking layers 230A, 230B and the light sources 260L and 260R. The controller 270 controls light characteristics of the light sources 260L and 260R and/or light blockage levels of the light blocking layers 230A and 230B to adjust ambient light characteristics.

In one of exemplary embodiments, the main body 210 comprises a light guide plate 216. The light guide plate 216 is made of transparent material comprises acrylic resin, polycarbonate, epoxy, or glass, etc. which has been described in a previous session.

In one embodiment, the light guide plate 216 may be formed by using a similar material and technique as the light guide plate described in FIG. 1A and thus will not be repeated here.

In one embodiment, the light blocking layer 230A and/or 230B may comprise electro-chromatic layers or electro-wetting layers. In one embodiment, the light blocking layer 230A or 230B comprises a similar structure and decoding scheme as those of light blocking layer shown in FIG. 1A and thus will not be further described.

Figure 3:
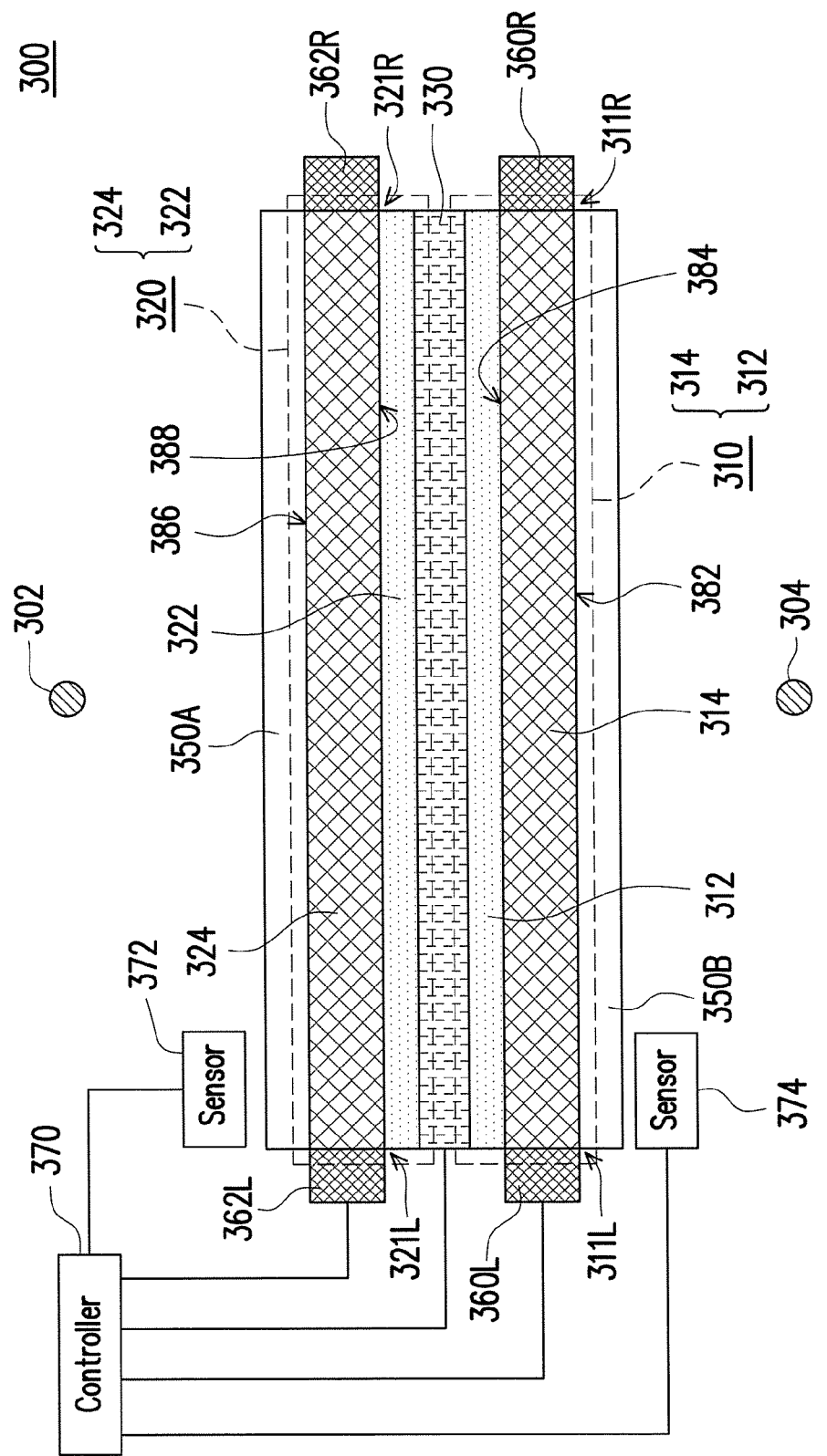
FIG. 3 schematically illustrates an ALA apparatus in another one of exemplary embodiments.

Please refer to FIG. 3, which schematically illustrates an ALA apparatus in another one of exemplary embodiments. With the similar structure of FIG. 1A, the ALA apparatus 300 comprises two main bodies stacked together and a light blocking layer sandwiched in between these two main bodies. Two edges of each main body are respectively attached with one set of light source. Each of the two main bodies may further comprise a light guide plate and/or a diffusion layer. A controller, coupled to these light sources and the light block layer, is also provided to control light characteristics of the light sources and/or light blockage levels of the light blocking layer to adjust ambient light characteristics.

The light blocking layer is partially or entirely adjusted with the light blockage level for blocking the view between an indoor position and an outdoor position. In one or some of exemplary embodiments, the light blocking layer is manually or automatically adjusted independently or correlated with each other through the controller. In one or some of exemplary embodiments of the disclosure, the light blocking layer can be programmed to be adjusted the light blockage levels for displaying a pre-set pattern. The light blocking layer 330 may be programmed to a pre-set pattern or to have certain spaces, frequencies and degrees of light blockage.

For more details, the ALA apparatus 300 comprises at least a first main body 310 (dash box, as shown), a second main body 320 (dash box, as shown), a light blocking layer 330, light sources 360L, 360R, 362L, 362R and a controller 370. The light blocking layer 330 is sandwiched in between the first main body 310 and the second main body 320. The ALA apparatus 300 further comprises a protective layer 350A which is disposed on a surface 386 of the second main body 320 facing to an outdoor position 302. The ALA apparatus 300 further comprises a second protective layer 350B on a surface 382 of the first main body 310 facing to an indoor position 304. In one of exemplary embodiments, the ALA apparatus 300 further comprises two sensors 372 and 374 respectively disposed adjacent to the second main body 320 facing the outdoor position 302, and the first main body 310 facing the indoor position 304. The two sensors 372 and 374, coupled to the controller 370, will sense light characteristics respectively in an outdoor environment and in an indoor environment and send the measured results therefrom to the controller 370. The aforesaid light characteristics comprise light intensity, light wavelength, light polarization and/or light colour temperature.

Each of the first main body 310 and the second main body 320 has a plurality of edges (311L and 311R, 321L and 321R). The light sources 360L and 360R are respectively mounted on the edges 311L and 311R of the first main body 310. The light sources 362L and 362R are respectively mounted on the edges 321L and 321R of the second main body 320.

The controller 370 is coupled to the light blocking layer 330 and the light source 360L, 360R, 362L, 362R and the light blocking layer 330. The controller 370 controls light characteristics of the light sources 360L, 360R, 362L, 362R and/or light blockage level of the light blocking layer 330 to adjust ambient light characteristics.

In one of exemplary embodiments, the first main body 310 comprises a light guide plate 314, and the second main body 320 comprises another light guide plate 324. The material of each of the light guide plates 314 and 324 are made with a similar material as those mentioned in FIG. 1A and FIG. 2, and thus will not be repeated here.

In one embodiment, the light guide plate 314 or 324 may be embedded or imprinted with light diffusible particles as mentioned earlier, and will not further described.

In other embodiment, the first main body 310 or the second main body 320 may further comprise at least a diffusion layer. For example, a diffusion layer 312 is formed on a first surface 384 of the light guide plate 314 and a diffusion layer 322 is formed on a first surface 388 of the light guide plate 324. Such diffusion layer has also been described in a previous session.

In one embodiment, the light blocking layer 330 may comprise electro-chromatic layers or electro-wetting layers. In one embodiment, the light blocking layer 330 comprises a transparent conductive electrode, an electro-chromatic stack layer on the first transparent conductive electrode, and a second transparent conductive electrode on the electro-chromatic stack layer.

The main goal of the dual light guide window design is to allow the window to selectively and independently emit the light towards either indoor or outdoor direction by using it own light source. It is not only applicable for adjusting ambient light, but also for displaying a pre-set pattern.

It is understandable, if the light guide material used already has embedded diffusion layer, the extra diffusion layer 312 and 322 can be omitted.

Figures 4A, 4B:
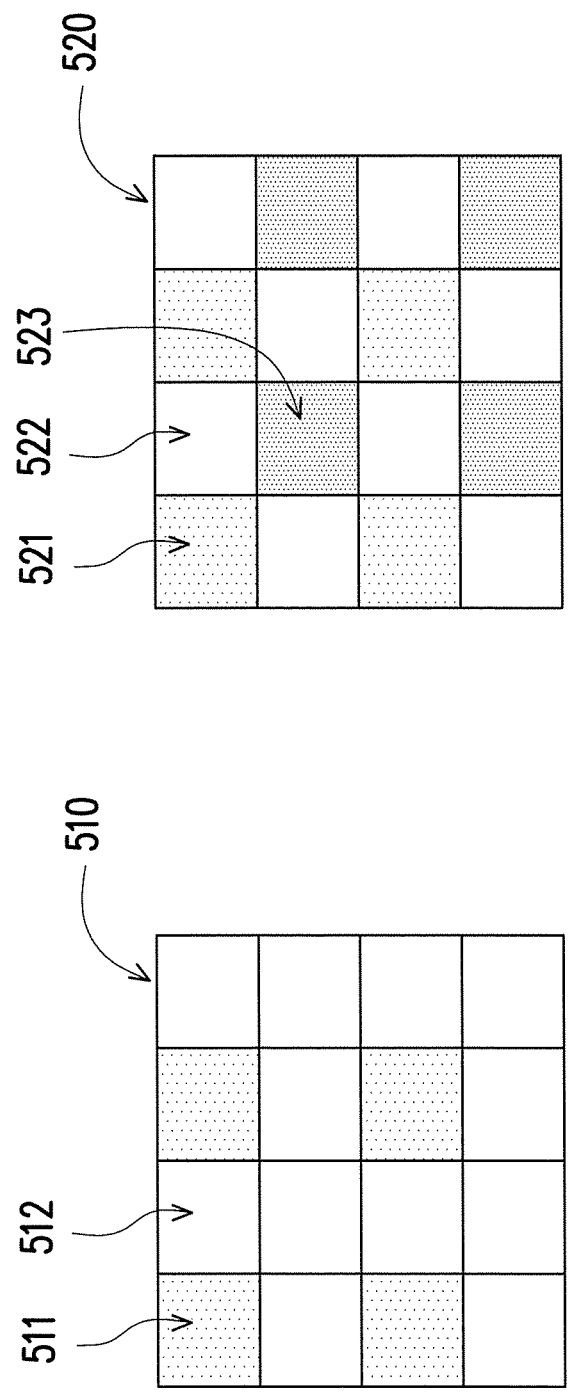
FIG. 4A-FIG. 4D schematically illustrate different pre-set patterns for the light blocking layer in aforesaid embodiments or in one or some of exemplary embodiments of the disclosure.
Figure 4C:
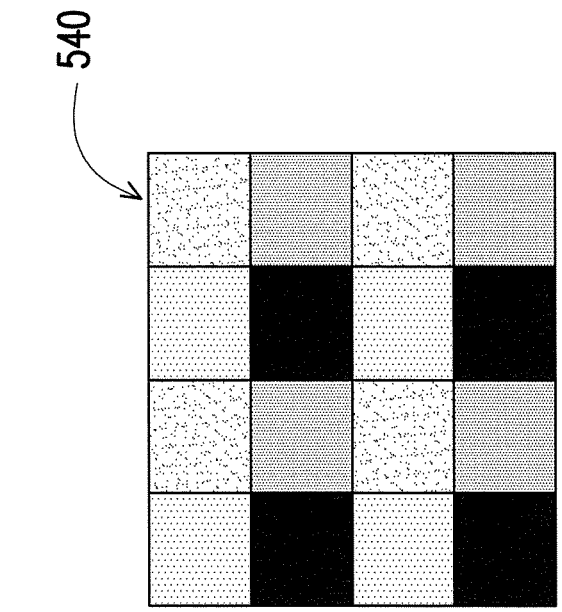
Figure 4D:
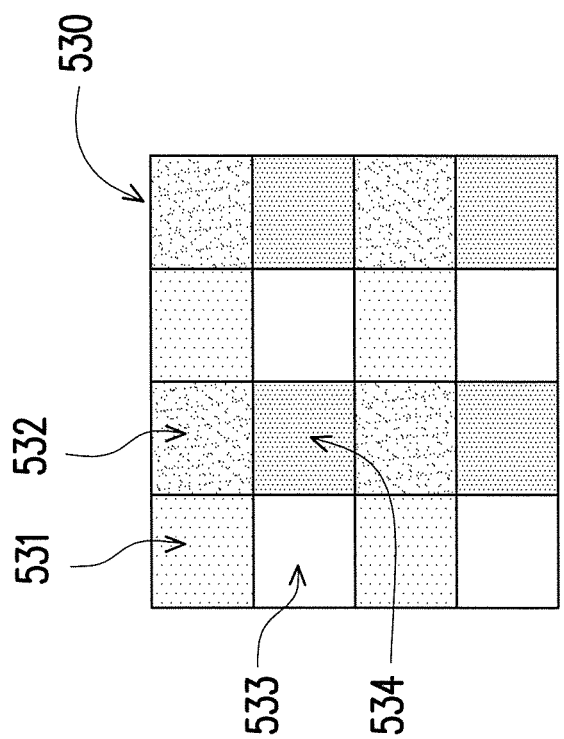

Please refer to FIG. 4A-FIG. 4D, which schematically illustrate different pre-set patterns for the light blocking layer in aforesaid embodiments or in one or some of exemplary embodiments of the disclosure. The light blocking layer introduced in the ALA apparatus or in the system, is partially or entirely adjusted with the light blockage levels for blocking the view between an indoor position and an outdoor position. The light blocking layer is manually or automatically adjusted through a controller. The light blocking layer can be made with decodable pixel array arrangement, so it can be programmed to display any pre-set patterns. It can also be programmed to switch at least one pixel or pixel groups on/off on selected address, for example, the pre-set patterns 510, 520, 530 and 540 respectively depicted in FIGS. 4A, 4B, 4C and 4D. It is also possible to partially switch at least one pixel or pixel groups to a preset blockage level. For example, as shown in FIG. 4A, there are at least two kinds of areas 511 and 512 with different light blockage levels, which are arranged to form the pattern 510. For instance, ignoring absorption of materials, the light blockage level of area 511 may be 75% of transmittance and 25% of reflectance. The light blockage level of area 512 may be 100% of transmittance and 0% of reflectance (ignore absorption) in FIG. 4A. As in FIG. 4B, there are at least three kinds of areas 521, 522 and 523 with different light blockage levels, which are arranged to form the pattern 520. For instance, the light blockage level of area 521 may be 75% of transmittance and 25% of reflectance (ignore absorption). The light blockage level of area 522 may be 100% of transmittance and 0% of reflectance (ignore absorption). The light blockage level of area 523 may be 50% of transmittance and 50% of reflectance (ignore absorption) in FIG. 4B. As in FIG. 4C, there are at least four kinds of areas 531, 532, 533 and 534 with different light blockage levels, which are arranged to form the pattern 530. For instance, the light blockage level of area 531 may be 75% of transmittance and 25% of reflectance (ignore absorption). The light blockage level of area 532 may be 50% of transmittance and 50% of reflectance (ignore absorption). The light blockage level of area 533 may be 100% of transmittance and 0% of reflectance (ignore absorption). The light blockage level of area 534 may be 25% of transmittance and 75% of reflectance (ignore absorption) in FIG. 4C. As in FIG. 4D, there are at least four kinds of areas with different light blockage levels, which are arranged to fain' the pattern 540, similar as the areas depicted in FIG. 4C. The difference between the areas depicted in FIG. 4C and FIG. 4D is that the light is blocked in one kind of the areas in FIG. 4D instead of being transmissive as the area 533 in FIG. 4C.

The different patterns may be selectively chosen by using one or more light blocking layers in an ALA apparatus of exemplary embodiments. In other words, the blocking layer may be achieved the afore-described patterns through utilizing the electro-chromatic layers or the electro-wetting layers, so as to adjust a level of blockage of the light blocking layer partially or entirely.

Figure 5:
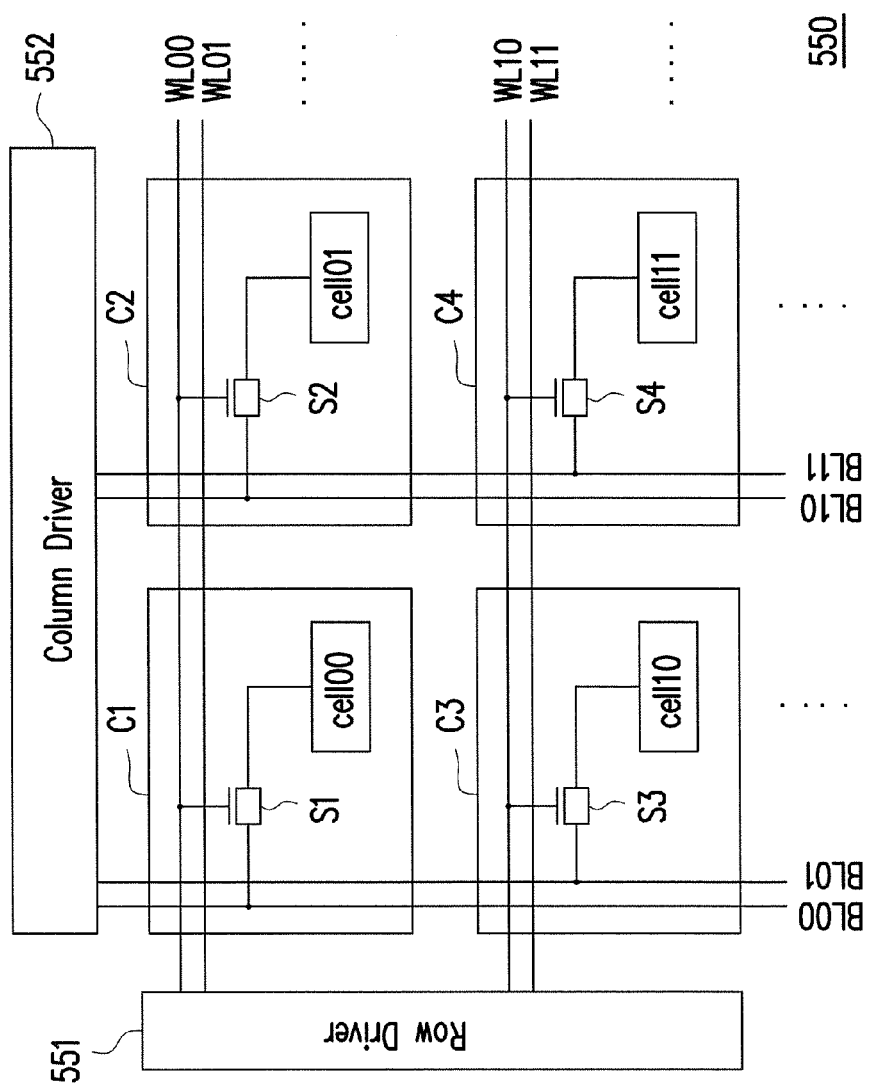
FIG. 5 illustrates a circuit schematic for driving and decoding four pixels in the light blocking layer in the embodiments depicted in FIG. 4A through FIG. 4D.

FIG. 5 illustrates a circuit schematic for driving and decoding four pixels in the light blocking layer in the embodiments depicted in FIG. 4A through FIG. 4D. Referring to FIG. 5, the circuit schematic 550 includes a row driver 551, a column driver 552 and a plurality of cells respectively arranged in array. Each cell represents as the pixel of the pre-set patterns described above. For instance, the cells C1, C2, C3, C4 depicted in FIG. 5 may be considered as the pixel areas 531, 532, 533, 534 depicted in FIG. 4C, respectively.

Each cell includes a switch and a cell component, in which the switch is electronically connected to a bit line, i.e. B00, B01 and a word line, i.e. W00, W01 and the cell component is coupled to the switch. Further, the word lines and the bit lines are respectively connected to the row driver 551 and the column driver 552. For instance, the cell C1 includes a switch Si and a cell component Cell00, in which the switch S1 is electronically connected to a bit line BL00 and a word line WL00, and the cell component Cell00 is coupled of the switch S1. The bit line BL00 is connected to the column driver 552, while the word line WL00 is connected to the row driver 551.

Under the configuration of the embodiment, each switch of the cell component on the light blocking layer is enabled through the row driver 551 or the column driver 552, so as to drive the cell component to control the light blockage level of the cell. In other words, each cell may be independently controlled, and the cells are programmed to form a desired pattern such as the pre-set patterns 510, 520, 530 and 540 depicted in FIGS. 5A, 5B, 5C and 5D. By this way, the light blocking layer can be programmed to be adjusted the light blockage levels, or for displaying the pre-set pattern.

Figure 6:
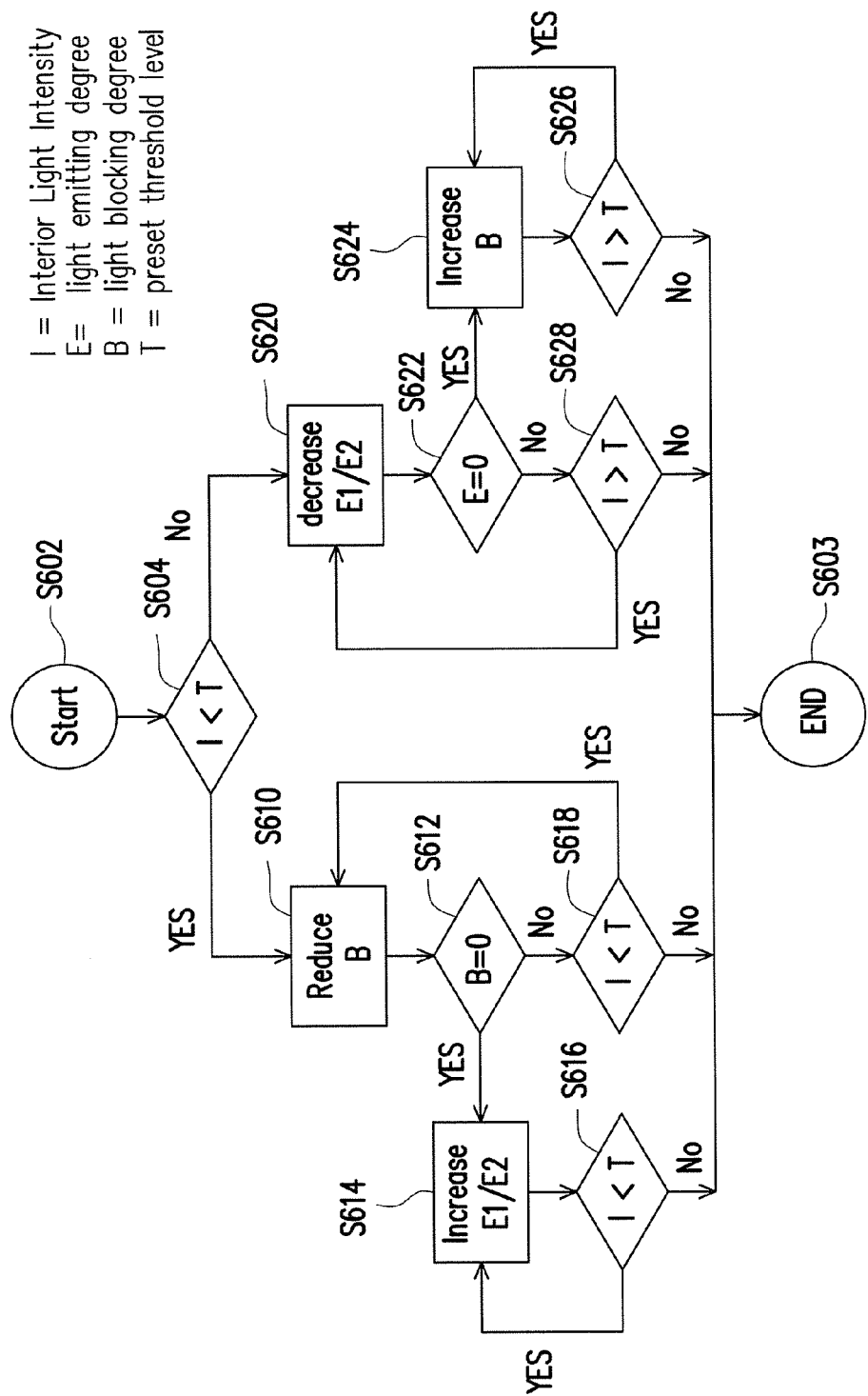
FIG. 6 illustrates a flow diagram indicating a method for an ALA apparatus to adjust indoor ambient light characteristics in one of exemplary embodiments.

Please refer to FIG. 6, a flow diagram which illustrates a method for an ALA apparatus to adjust indoor ambient light characteristics in one of exemplary embodiments. In the method for the ALA apparatus, indoor light characteristics are sensed firstly. The sensed indoor light characteristics are compared with a pre-set threshold. The indoor ambient light characteristics are adjusted based on the at least one pre-set threshold by performing at least one of the following steps: adjusting a degree of blockage of the light blocking layer partially or entirely; adjusting light characteristics of the light source; and adjusting light characteristics of an indoor light source. There are of course many ways to set the program, here a more energy-saving route is considered. Any other method similar to this approach is not excluded from the spirit of this proposal.

For more details, please refer to FIG. 6, in step S602, the method starts from sensing the indoor light characteristics, for example, an interior light intensity of the indoor light characteristics is sensed and obtained a set of measured results therefrom, which is denoted as "I" in FIG. 6. The aforesaid light characteristics may comprise, but not limited thereto, a light intensity, a light wavelength, a light polarization and/or a light colours temperature, or combination thereof. In step S604, the interior light intensity (I) is compared with a pre-set threshold level, denoted as "T", which is prepared in advance or is designated by the user. If the interior light intensity (I) is smaller than the pre-set threshold level (T), light blocking degree ("B") or the light blockage level of a light blocking layer in the ALA apparatus will be reduced to increase the interior light intensity (I) of the indoor light characteristics, as in step S610. In step S612, it is then determined that if the light blocking degree (B) is reduced to zero. If no, it means that there still is room to change the light blocking degree (B) and then the step of comparing the interior light intensity (I) with the pre-set threshold level will be processed again, as in step S618. If the interior light intensity (I) is still smaller than the pre-set threshold level (T), the step S610 will be performed in an iterative manner till there is no room to increase the interior light intensity (I) by adjust the light blocking degree (B).

If the comparing result in step S612 is yes, it means that the light blocking degree (B) cannot be reduced anymore to improve or increase the interior light intensity (I), as in step S614, light emitting degrees of light sources in the ALA apparatus may be increased. As in some of the aforesaid embodiments, for example, two light sources are proposed and their light emitting degrees (E1/E2) are increased to provide more lights to improve or increase the interior light intensity (I). As in following step S616, the step of comparing the interior light intensity (I) with the pre-set threshold level will be processed again. In this case, if the interior light intensity (I) is still smaller than the pre-set threshold level (T), the step S614 will be performed again in an iterative manner till the interior light intensity (I) is greater than the pre-set threshold level (T).

In other case, in step S604, that the interior light intensity (I) is not smaller than the pre-set threshold level (T), light emitting degrees of light sources in the ALA apparatus may be decreased. For example, two light sources are proposed and their light emitting degrees (E1/E2) are decreased to provide lower or fewer lights to decrease the interior light intensity (I), in step S620. In step 622, it is then determined that if the light emitting degrees (E1/E2) of the light sources are reduced to zero. If no, it means that there still is room to change the light emitting degrees (E1/E2) and then the step of comparing the interior light intensity (I) with the pre-set threshold level will be processed again, as in step S628. If the interior light intensity (I) is still larger than the pre-set threshold level (T), the step S620 will be performed in an iterative manner till there is no room to decrease the interior light intensity (I) by adjust the light emitting degrees (E1/E2). If the comparing result in step S622 is yes, it means that the light emitting degrees (E1/E2) cannot be reduced anymore to decrease the interior light intensity (I), as in step S624, the light blocking degree (B) or the light blockage level of the light blocking layer may be increased to blocking incident lights. As in following step S626, the step of comparing the interior light intensity (I) compared with the pre-set threshold level will be processed again. If the interior light intensity (I) is still larger than the pre-set threshold level (T), the step S624 will be performed again in an iterative manner till the interior light intensity (I) is smaller than the pre-set threshold level (T).

In another embodiment (not shown), instead of iteratively comparing the interior light intensity (I) with the pre-set threshold level (T) as shown in step 604 of FIG. 6, the pre-set threshold level (T) may be arranged as Tmin/Tmax, and when the interior light intensity (I) is greater than the pre-set threshold level (T) and the interior light intensity (I) is greater than Tmax (namely, I>T and I>Tmax), the subsequent adjustment is then performed.

In other embodiment (not shown), the comparison between the interior light intensity (I) and the pre-set threshold level (T) may be an error value (E) so as to perform the step S604, that is, the interior light intensity (I) is an error value (E) less than the pre-set threshold level (T), I<T+E, or the interior light intensity (I) is an error value (E) greater than the pre-set threshold level (T), I>T+E, where the error value (E) may be configured as 0%-10% of the pre-set threshold level (T).

Alternatively, the interior light intensity (I) may be arranged to be ±10% tolerance of the pre-set threshold level (T), so that the method for the ALA apparatus to adjust indoor ambient light characteristics may be began automatically. Further, it should be noted that the comparison depicted in step S604 may not be required to compare all the time, such comparison may be performed periodically. For example, the step S602 may be performed automatically every half an hour, so that the adjustment of light emitting degrees (E1/E2) or light blocking degree (B) is executed every 30 minutes. The time for starting the step S602 may be arranged, for instance, the step S602 is set not to perform from 10 pm to 5 am every day, or the step S602 is set to perform at 6 am, 13 pm and 20 pm every day, although the disclosure is not limited thereto. A user may manually program the controller within a period of time for controller to learn user's preference of interior light settings. After, the manual mode period is over, the user can switch it to an automatic mode, the controller will take over and use the user's preference settings to control the indoor light characteristics.

Please refer to FIG. 7A, which schematically illustrates an ALA apparatus in one of exemplary embodiments with a light blocking layer comprising electro-chromatic layers. The ALA apparatus 700 comprises at least a main body 710, a light blocking layer 720, a plurality of light sources (730, for example) and a controller (not shown). The main body 710 may comprise a light guide plate and a diffusion layer 712. The diffusion layer can be fully or partially disposed on the surface of the light guide plate. In this particular example, the diffusion layer is partially coated on the light guide plate. Such that the light blocking layer 720 is disposed partially on the main body 710 or partially on the diffusion layer 712. The controller controls light characteristics of the light source 730 and/or light blockage levels of the light blocking layer 720 to adjust ambient light characteristics. The ALA apparatus 700 further comprises a protective layer 740 on the light blocking layer 720 and a protective layer 742 on the main body 710 opposing to the surface facing the light blocking layer 720.

In one embodiment, the light guide plate may be embedded or imprinted with light diffusible particles to have a desired refractive index. In another embodiment, the diffusion layer 712 may also be provided for the refractive index. The diffusion layer 712 can be a self-assembled monolayer, a particle-embedded layer, a micro-machined structure layer or a printed dot-pattern layer, for example.

In one embodiment, the light blocking layer 720 may be a decodable light blocking layer for programming spaces, frequencies and degrees of light blockage. That means that a pre-determined or pre-set pattern may be arranged by decoding in the light blocking layer 720, in which different areas or partitions thereof may have different degrees of light blockage. In the embodiment, the light blocking layer 720 can comprise electro-chromatic devices 722. In one embodiment, please refer to FIG. 7B, the electro-chromatic devices 722 comprises a transparent conductive layer (TCL) 7221A, an electro-chromatic stack layer on the first transparent conductive electrode, and a second transparent conductive layer (TCL) 7221B on the electro-chromatic stack layer. The electro-chromatic stack layer comprises an electro-chromic (EC) layer 7222, an electrolyte layer 7223 on the electro-chromic (EC) layer 7222, and an ion layer 7224 stacked together.

The electro-chromic (EC) layer 7222 may comprise $H_xWO_3$, $LixWO_3$, $NaxWO_3$, $MoO_3$, $V_2O_5$, $Nb_2O_5$ or $TiO_2$, (4-((4-(N,N-dimethylamine)-phenyl) (phenyl) amino) benzyl) phosphoric acid, for example. The ion layer 7224 may comprise ion conductive materials, metal salts, alkali metal salts, alkaline earth metal salts, quaternary ammonium salts, alloy, metal oxide, ceramic oxide, modified-PMMA, $Ta_2O_5$, $SiO_2$, Poly-AMPS, PEO copolymer, $LiClO_4$/Poly carbonat, Li-PEO, Li—B—$SiO_2$, PPG-$LiCLO_4$-MMA, $LiNbO_3$, Modified PEO, Li polymer, titanium dioxide (rutile), zirconium dioxide with yttrium oxide, $LiAl_5O_8$, $Li_5AlO_4$, $LiMnO_2$, $Li_2MnO_2$, $LiCoO_2$, $LiNiO_2$, $LiFeO_2$, $NaNiO_2$, $NaCoO_2$ doped iron, $AgNO_3$ with $Ni(NO_3)_2$, $Co(NO_3)_2$, PEDOT. The electrolyte layer 7223 may comprise solvent type electrolyte such as the solvent such as propylene carbonate, ethylenecarbonate, sulfolane, gamma-butyrolactone, dimethylformamide, dimethylsulfoxide, ethylene carbonate, Polymer type electrolyte such as polyethylene oxide, polyoxyethylene glycol polymethacrylate. The ion storage layer may comprise NiO, CeOx, $LixCrO_4$, $LiV_2O_5$, $LiCoO_2$, $Li_xNi_yO$, $V_2O_5$, $Cr_2O_3$ or CoO.

Figure 8:
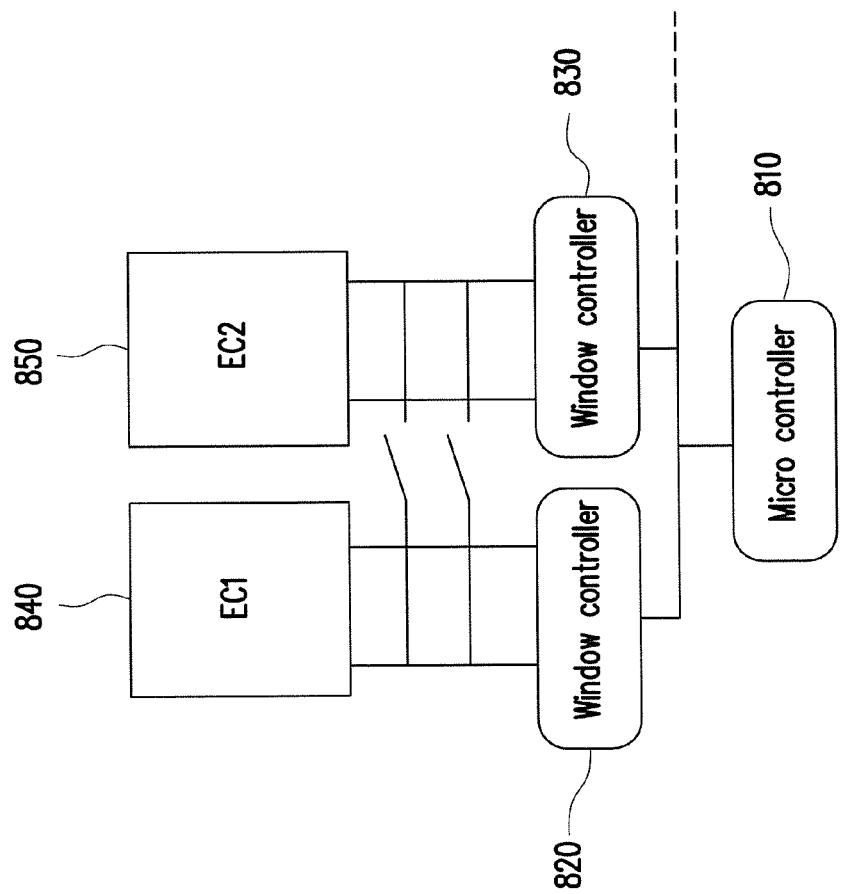
FIG. 8 schematically illustrates a control architecture between a controller and a light blocking layer comprising electro-chromatic layers in an ALA apparatus of one of exemplary embodiments of the disclosure.

Please refer to FIG. 8, which schematically illustrates a control architecture between a controller and a light blocking layer comprising electro-chromatic layers in the ALA apparatus of one of exemplary embodiments of the disclosure. In the control architecture, the controller may, for example, comprises a micro controller 810 coupled to a plurality of window controllers each of which for controlling respective one of electro-chromatic units. As shown, the window controller 820 is coupled to an electro-chromatic unit (EC1) 840, and the other window controller 830 is coupled to another electro-chromatic unit (EC2) 850. In this case, each window controller can control a portion of the window or a full window. The micro-controller may be used to control a smart window system comprises a plurality of windows.

Figure 9A:
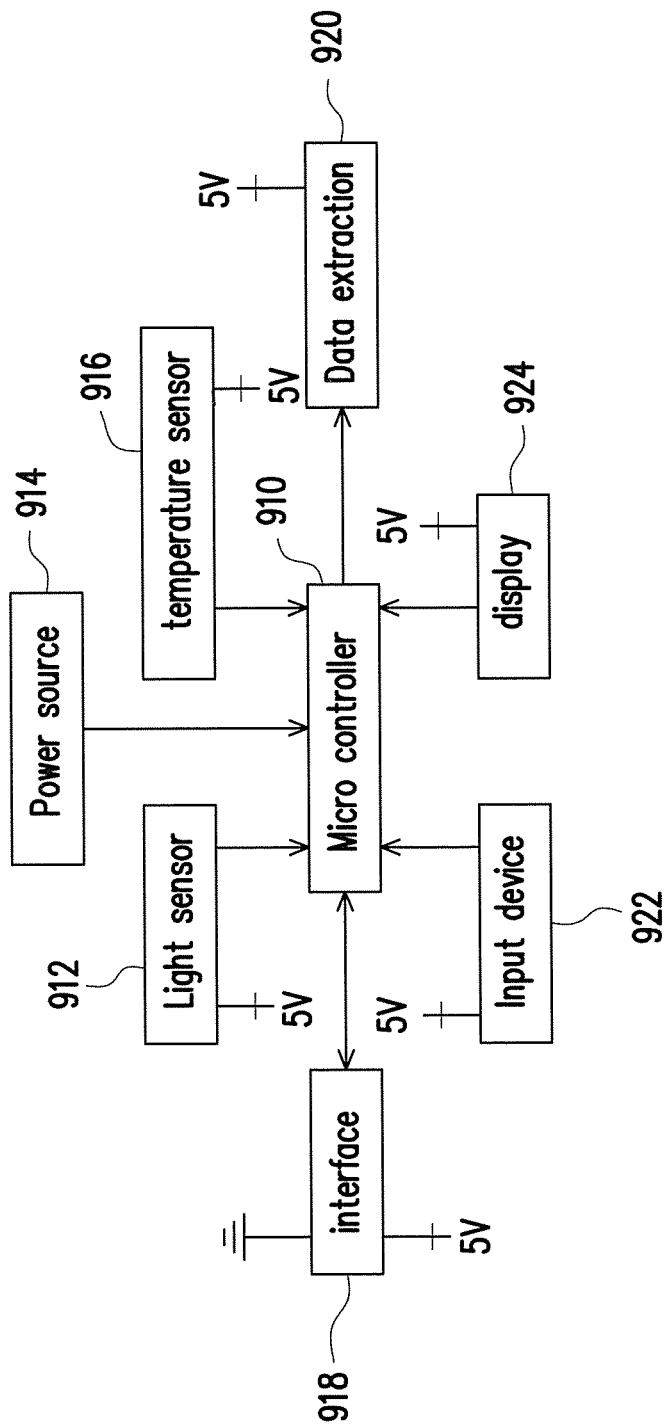
FIG. 9A and FIG. 9B schematically illustrate control architectures for a controller in an ALA apparatus of one of exemplary embodiments of the disclosure.
Figure 9B:
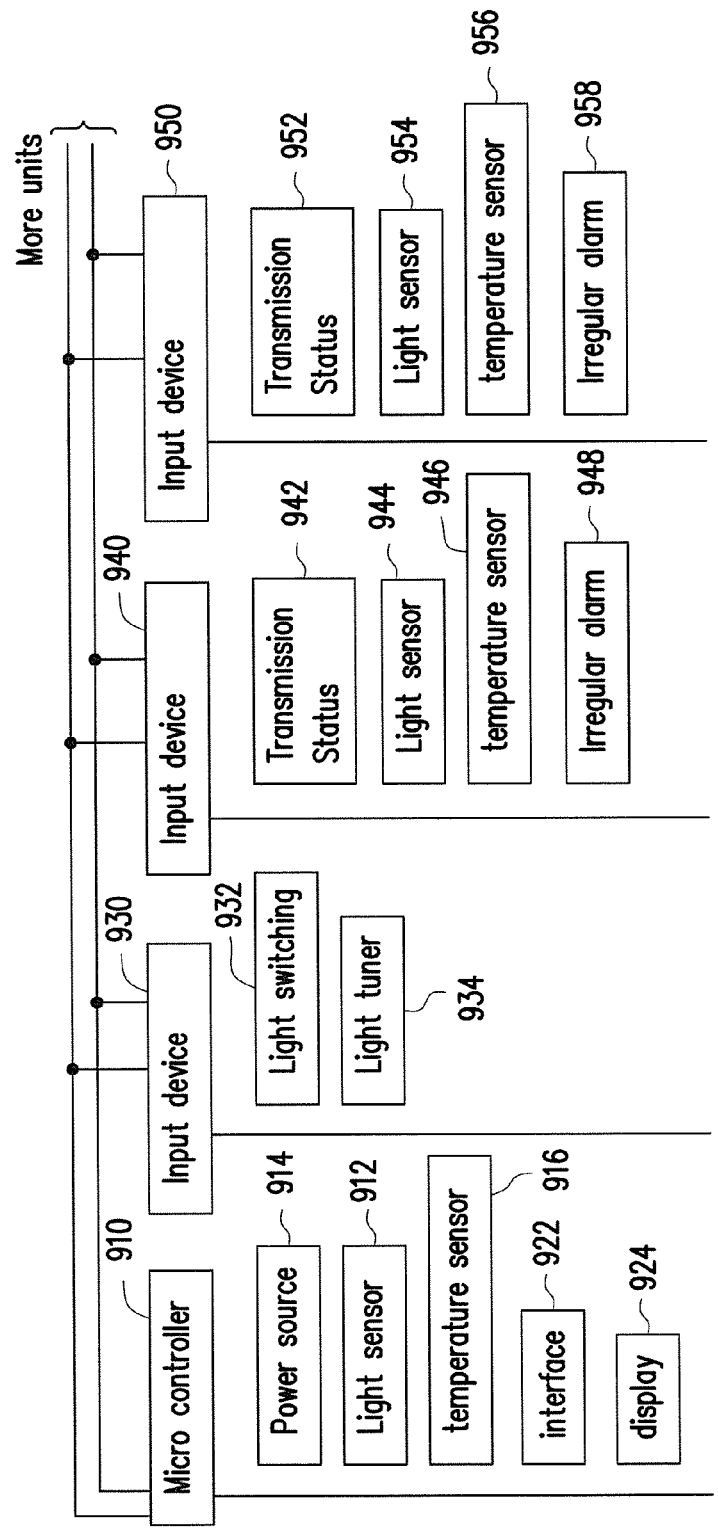

Please refer to FIG. 9A and FIG. 9B, which schematically illustrate control architectures for a controller in an ALA apparatus of one of exemplary embodiments of the disclosure. The controller is programmed with at least one pre-set threshold, and the controller adjusts light characteristics of the light source and/or light blockage levels of the light blocking layer based on the pre-set threshold, thereby the indoor ambient light characteristics are adjusted accordingly. The aforesaid light characteristics comprise light intensity, light wavelength, light polarization and/or light color temperature.

In one embodiment, the controller comprises a micro controller 910, which is coupled to a plurality of peripheral devices such as a light sensor 912, a power source 914, a temperature sensor 916, an interface device 918, a data extraction unit 920, an input device 922 and a display 924. The power source 914 provides power for the micro controller 910. The light sensor 912 and the temperature sensor 916 respectively provide sensed results of light and temperature to the micro controller 910. The interface device 918 provides an interface for connecting to external devices such as a Smart phone, a remote control, or any other handheld device. The display 924 provides an interface for displaying some information, or one may also use interface to link a remote display to monitor and control the operation.

As shown in FIG. 9B, the micro controller 910 is coupled to a plurality of input devices, i.e. 930, 940 and 950, such as a key board, voice activation device, microphone, touch panel, etc. to input parameters or setting programs. Through the input device 930, a light switching unit 932 and a light tuner is controlled by the micro controller 910. Through the input device 940, a transmission status unit 942, a light sensor 944 and a temperature sensor 946 and an irregular alarm 948 are controlled by the micro controller 910. Through input device 950, a transmission status unit 952, a light sensor 954 and a temperature sensor 956 and an irregular alarm 958 are controlled by the micro controller 910.

In aforesaid embodiment, one or more programs stored in a memory unit are configured to be executed by the micro controller 910 for conducting sensing indoor light characteristics; comparing the sensed indoor light characteristics with a pre-set threshold; adjusting indoor light characteristics based on the comparison; and conducting at least one of following steps: tuning the blockage of the light blocking layer; adjusting the light characteristics of the light source; and adjusting indoor light characteristics.

Please refer to FIG. 10, which schematically illustrates a blocking view example by using in an ALA apparatus of one of exemplary embodiments of the disclosure. The indoor ALA apparatus 1020 with a micro controller 1010 is provided for adjusting indoor ambient light characteristics herein. By using the ALA apparatus 1020, a view or a view angle between an indoor position 1002 and an outdoor position 1004 can be partially or entirely blocked. Two sensors 1030 and 1032 are further provided to the indoor ALA apparatus 1020, so as to respectively sense the light characteristics of the indoor and outdoor environments.

In one of exemplary embodiments, a signal/noise (S/N) ratio modification method is proposed for adjusting the view or the view angle of the architecture. Moreover, in one embodiment, a light blocking layer is introduced in the ALA apparatus or in the system, in which the light blocking layer may be partially or entirely adjusted with the light blockage levels for blocking the view between the indoor position 1002 and the outdoor position 1004 manually or automatically via the controller 1010.

Based on human vision principle, several factors are taken into consideration in the operation of the indoor ALA apparatus 1020, that is, the signal/noise (S/N) ratio modification, the spatial frequency and the pupil diameter. Specifically, the pupil diameter of a human eye varies in response to the change of ambient light intensity, for instance, the pupil diameter shrinks as the ambient light intensity increases, while the pupil diameter enlarges as the ambient light intensity decreases. In other words, the diameter of the pupil generally depends on an average luminance of an observed object. As such, the pupil diameter for a given luminance may be calculated through the following formula:

$$d = 5 - 3 \tan h(0.4 \log L) \qquad \text{(Formula 1)}$$

where L is the average luminance in units, d is the pupil diameter in mm.

Besides, when the field size is taken into account, the pupil diameter for a given luminance may be obtained through the following formula:

$$d = 5 - 3 \tan h\{0.4 \log(LX_0^2/40^2)\} \qquad \text{(Formula 2)}$$

where $X_0$ is the angular field size of the object in degrees. It should be noted that the calculation of the pupil diameter in the disclosure may be referred to "Contrast Sensitivity of the Human Eye and Its Effects on Image Quality—Peter G. J. Barten, 1999", and thus the detailed description of the pupil diameter calculation will be omitted hereafter.

In addition, after the pupil diameter is calculated through the afore-described formulas, an retinal illumination of the human eye may be further calculated through the following formula:

$$E_{(Troland)} = \frac{\pi d^2}{4} L \quad \text{(Formula 3)}$$

$$E = \frac{\pi d^2}{4} L \left\{ 1 - \left(\frac{d}{9.7}\right)^2 + (d/12.4)^4 \right\} \quad \text{(Formula 4)}$$

where d is the pupil diameter in mm, and L is the average luminance in units, in which Formula 4 is also known as the Stiles-Crawford effect, and Troland is a unit of the retinal illumination, which is utilized to correct photometric measurements of illumination that fall on the retina by scaling them to the effective pupil size. In other words, the illumination falling on the retina of the human eye may be obtained according to the average luminance and the pupil diameter.

Moreover, regarding the signal/noise (S/N) ratio modification, the calculation of the signal/noise ratio modification may be carried out by the following formulas:

$$SNR = \frac{P_{signal}}{P_{noise}} = \left(\frac{A_{signal}}{A_{noise}}\right)^2 \quad \text{(Formula 5)}$$

where P is the average power and A is the root mean square (RMS) amplitude. It should be noted that both the signal and noise powers must be measured at the same or equivalent points in a system and measured across the same impedance.

Further, due to many signals have a very wide dynamic range, SNRs are often expressed using the logarithmicdecibel scale, in which the SNR may be defined using amplitude ratios through the following formula:

$$SNR(\text{dB}) = 10\log_{10}\left(\frac{P_{signal}}{P_{noise}}\right) = 20\log_{10}\left(\frac{A_{signal}}{A_{noise}}\right) \quad \text{(Formula 6)}$$

where P is the average power and A is the root mean square (RMS) amplitude. It should be noted that the signal variable in the formulas may be considered as the light intensity transmitting from the ALA apparatus and received by the indoor person after being reflected by the light blocking layer and the outdoor person, while the noise variable in the formulas may be considered as the light intensity transmitting from the ALA apparatus to the indoor environment without being reflected by the outdoor person.

To be more specific, FIG. 11 schematically illustrates a calculation of signal/noise (S/N) ratio in an ALA apparatus of one of exemplary embodiments of the disclosure in the situation considering the light from backlight layer only. Here, a light blocking layer 1130 and a light guide plate 1160 of the ALA apparatus are illustrated, in which the light guide plate 1160 receives light emitted from the light sources (not shown) and transmits the light to the light blocking layer 1130 towards the indoor environment. Referring to FIG. 11, the luminance outputted from the light guide plate 1160 is indicated as $L_O$, and such luminance is changed to $L_OT$ (where T is the transmittance of the light blocking layer 1130) after the light passes through the light blocking layer 1130, which may be considered as the noise variable in the signal/noise (S/N) ratio.

On the other hand, from the outdoor position 1004 perspective, the luminance $L_O$ outputted from the light guide plate 1160 may be reflected by the light blocking layer 1130 to become as $L_OR$. Then, the luminance $L_OR$ along with the luminance $L_O$ outputted from the light guide plate 1160 may be reflected as the light reaches the outdoor position 1004, so that the luminance at the outdoor position 1004 has been changed to $(L_OR+L_O)\times R_H$, where $R_H$ is the human body reflection ratio, 50%, for instance.

Further, from the indoor position 1002 perspective, after the light is reached the outdoor position 1004 and reflected back to the indoor position 1002 through the ALA apparatus, the luminance that the person receives at the indoor position 1002 is $(L_OR+L_O)\times R_H\times T$, which may be considered as the signal variable in the signal/noise (S/N) ratio. As such, the signal/noise (S/N) ratio for a viewer indoor may be estimated through the following formula:

$$\frac{S}{N} = \frac{(L_0 + L_0R)\times R_H \times T}{L_0 T} = \frac{(1+R)\times R_H}{1}, \quad \text{(Formula 7)}$$

where the signal/noise (SN) ratio is configured to be less than 10 in the disclosure, that is, $(1+R)\times R_H/1 \ll 10$.

In contrast, the signal/noise (S/N) ratio for a viewer outdoor may be estimated through the following formula:

$$\frac{S}{N} = \frac{(L_0 T)\times R_H \times T}{L_0} = \frac{T^2 \times R_H}{1} < 1 \quad \text{(Formula 8)}$$

It should be noted that a signal/noise (SN) ratio threshold for a viewer indoor may be arranged between 5 and 1000 and a signal/noise (S/N) ratio threshold for a viewer outdoor may be arranged below 1 as the light sources and light blocking layer of the ALA apparatus are disabled. Based on the above, in the embodiments of the disclosure taken such factors into consideration, the light blocking layer(s) may be employed to control the light blockage levels so as to adjust the ambient light characteristics between the indoor and outdoor positions, in which the light blockage levels may be further controlled when the pre-set pattern of the light blocking layer(s) is configured, so that the light blocking layer is partially or entirely adjusted with the various light blockage levels thereon in order to block the desired view or view angle between the indoor and outdoor positions. Moreover, besides the light guide plate with specified refractive index, the diffusion layer(s) may be equipped with the light guide plate to diffuse and reflect the light emitted from the light sources. As such, a desired degree of privacy may be achieved through the afore-described components of the ALA apparatus (that is, the light blocking layer, the light guide plate and the diffusion layer). By this way, the ALA apparatus of the disclosure may be served as various modes for the privacy of the indoor environment. The following descriptions are further illustrated individual mode which the ALA apparatus can be served.

FIG. 12A through FIG. 12D schematically illustrate various modes that an ALA apparatus being served in one of exemplary embodiments of the disclosure. Here, the ALA apparatus depicted in FIG. 2A is employed for illustration, in which the main body is sandwiched in between two light blocking layers, although the disclosure is not limited thereto.

Figure 12A:
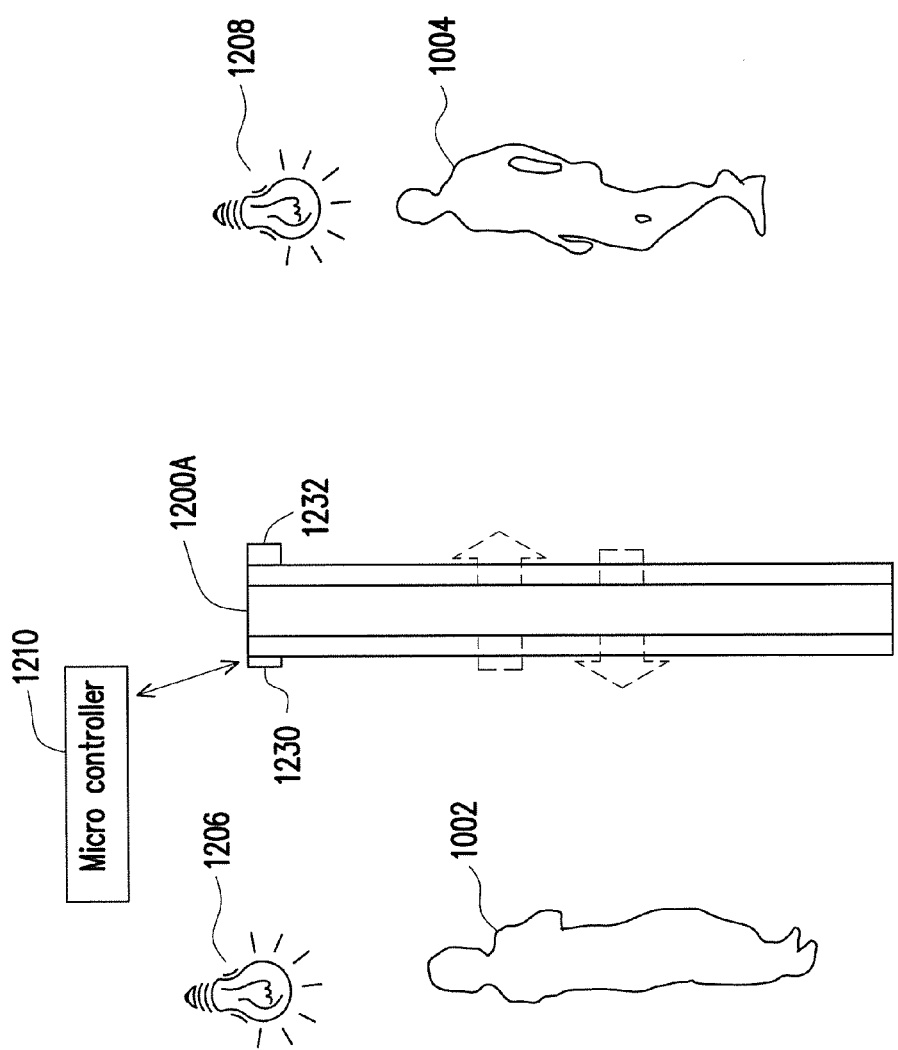

Referring to FIG. 12A, the ALA apparatus 1200A separates the indoor and outdoor environments, in which the indoor environment includes an indoor light source 1206 and the outdoor environment includes an outdoor light source 1208, where the outdoor light source 1208 provides same light intensity as the indoor light source 1206.

In this embodiment, either one or both of the light blocking layers of the ALA apparatus 1200A may be partially or entirely adjusted with the light blockage levels respectively thereon via the micro controller 1210, and/or, either one or both of the light blocking layers may be adjusted independently or correlated with each other through the micro controller 1210, in which the pre-set patterns of the light blocking layers may be arranged as that of depicted in FIG. 4A through FIG. 4D to adjust the light blockage levels. Through the light blocking layers of the ALA apparatus 1200A, a ratio of the light transmittance and the light reflection may be obtained (for instance, T/R=9/1), such that the indoor ambient light is equivalent to the outdoor ambient light. By this way, the persons respectively at the indoor and outdoor positions 1002, 1004 are able to see each other through the ALA apparatus 1200A with the outdoor light source 1208 provides same light intensity as the indoor light source 1206. In this case, the mode of the ALA apparatus 1200A may be regarded as a regular window, for instance.

Figure 12B:
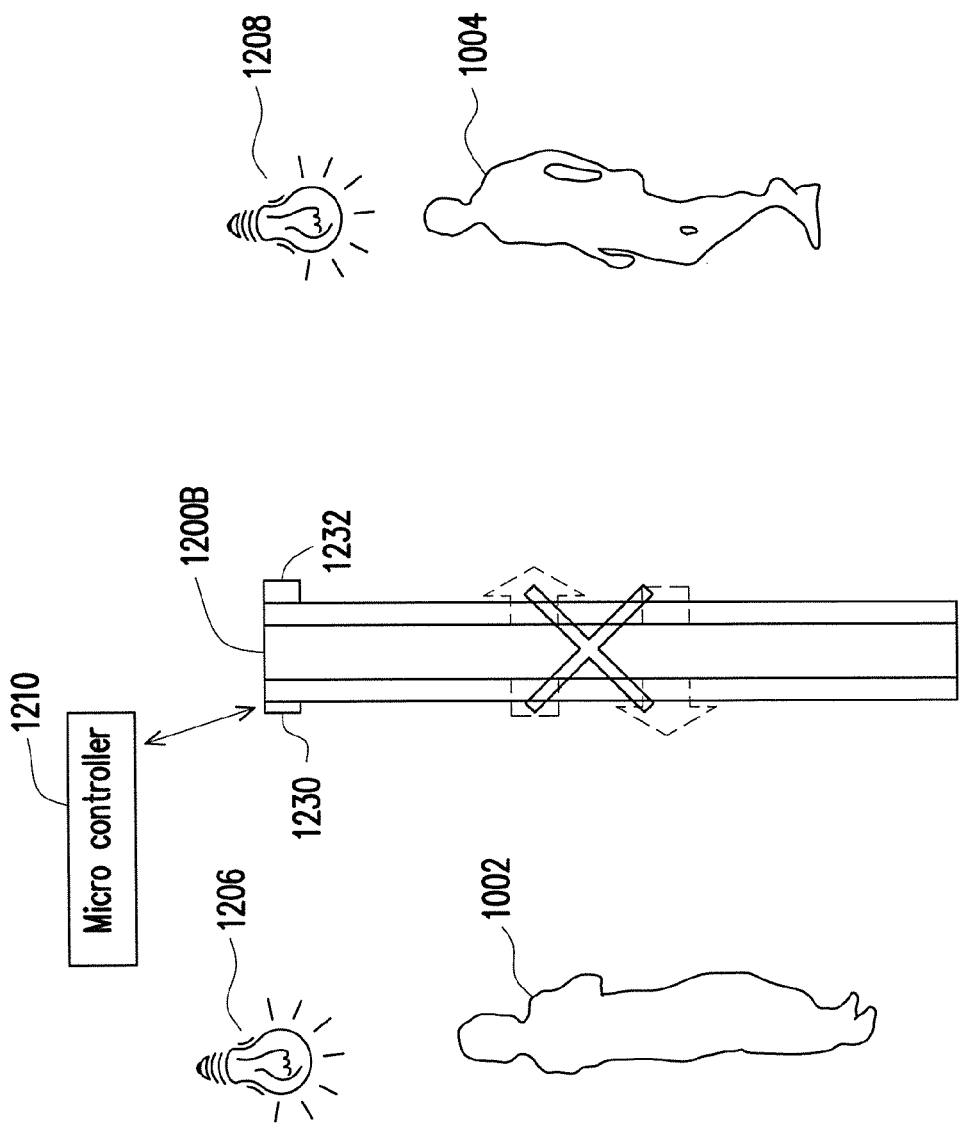

Referring to FIG. 12B, the ALA apparatus 1200B separates the indoor and outdoor environments, in which the indoor environment includes an indoor light source 1206 and the outdoor environment includes an outdoor light source 1208, where the outdoor light source 1208 provides same light intensity as the indoor light source 1206.

In this embodiment, either one or both of the light blocking layers of the ALA apparatus 1200B may be partially or entirely adjusted with the light blockage levels respectively thereon via the micro controller 1210, and/or, either one or both of the light blocking layers may be adjusted independently or correlated with each other through the micro controller 1210, in which the pre-set patterns of the light blocking layers may be arranged as that of depicted in FIG. 4A through FIG. 4D to adjust the light blockage levels. Through the light blocking layers of the ALA apparatus 1200B, the light transmittance may be configured to be zero (that is, T=0), such that the ambient lights of the indoor and outdoor environments are completely blocked by the ALA apparatus 1200B. In other words, the ALA apparatus 1200B may be in a total reflection state. By this way, the persons respectively at the indoor and outdoor positions 1002, 1004 are unable to see each other through the ALA apparatus 1200B, from both the indoor and outdoor perspectives, regardless the indoor and outdoor ambient light intensities. For example, the person at the indoor position 1002 is incapable of seeing the person at the outdoor position 1004 through the ALA apparatus 1200B. Similarly, the person at the outdoor position 1004 is incapable of seeing the person at the indoor position 1002 through the ALA apparatus 1200B. In this case, the mode of the ALA apparatus 1200B may be regarded as a shutter and/or curtain being drawn down, for instance.

Figure 12C:
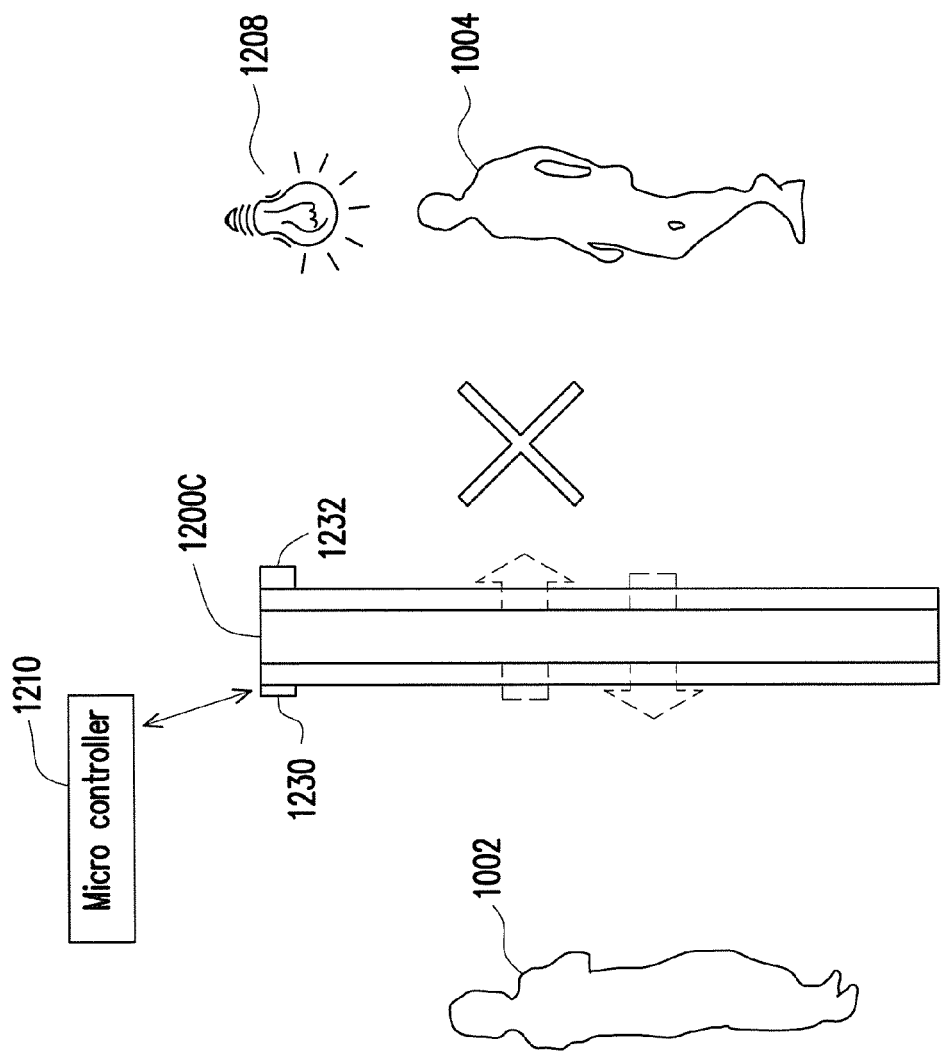

Referring to FIG. 12C, the ALA apparatus 1200C separates the indoor and outdoor environments, in which the outdoor environment includes an outdoor light source 1208 whereas the indoor environment has no indoor light source provided. That is to say, the indoor environment is in a darker state than the outdoor environment.

In this embodiment, either one or both of the light blocking layers of the ALA apparatus 1200C may be partially or entirely adjusted with the light blockage levels respectively thereon via the micro controller 1210, and/or, either one or both of the light blocking layers may be adjusted independently or correlated with each other through the micro controller 1210, in which the pre-set patterns of the light blocking layers may be arranged as that of depicted in FIG. 4A through FIG. 4D to adjust the light blockage levels. Through the light blocking layers of the ALA apparatus 1200C, a ratio of the light transmittance and the light reflection may be obtained (for instance, T/R=1/9 or 2/8), such that a portion of the ALA apparatus 1200C has become highly reflective and the indoor ambient light is far less than the outdoor ambient light. By this way, the person at the outdoor position 1004 is unable to see the indoor environment whereas the person at the indoor position 1002 remains the ability to see the outdoor environment, through the ALA apparatus 1200C with a specific T/R ratio. In this case, the mode of the ALA apparatus 1200C may be regarded as a one-way mirror of an interrogation room, for instance.

Referring to FIG. 12D, the ALA apparatus 1200D separates the indoor and outdoor environments, in which the indoor environment includes at least two indoor light sources 1206 and the outdoor environment includes an outdoor light source 1208. That is to say, the indoor environment is in a brighter state than the outdoor environment. It should be noted that as long as the indoor environment is brighter than the indoor environment, the quantity of the indoor light sources 1206 is not limited to the embodiment.

In this embodiment, either one or both of the light blocking layers of the ALA apparatus 1200D may be partially or entirely adjusted with the light blockage levels respectively thereon via the micro controller 1210, and/or, either one or both of the light blocking layers may be adjusted independently or correlated with each other through the micro controller 1210, in which the pre-set patterns of the light blocking layers may be arranged as that of depicted in FIG. 4A through FIG. 4D to adjust the light blockage levels. Through the light blocking layers of the ALA apparatus 1200D, a ratio of the light transmittance and the light reflection may be arranged to satisfy a specific relationship (namely, T<R) in a manner that the regions of the light blocking layers being all modified or being spatial multiplexed, such that the ratio of the light transmittance and the light reflection may be controllable to adjust the indoor and outdoor ambient lights in order for the ALA apparatus 1200D to become partially reflective. By this way, the person at the outdoor position 1004 is unable to see the indoor environment whereas the person at the indoor position 1002 remains the ability to see the outdoor environment, through the ALA apparatus 1200D with a controllable T/R ratio, in particular, the indoor environment is brighter than the outdoor environment. In this case, the mode of the ALA apparatus 1200D may also be regarded as a one-way mirror illustrated in FIG. 12C, however, the differences between the embodiments depicted in FIG. 12C and FIG. 12D are that the ALA apparatus 1200C has a fixed T/R ratio and the indoor environment requires to be darker than the outdoor environment, by contrast, the ALA apparatus 1200D has a controllable T/R ratio which allows the ALA apparatus 1200D to function as the ALA apparatus 1200C (such as one-way mirror) under the circumstances that the indoor environment is brighter than the outdoor environment.

Figure 13A:
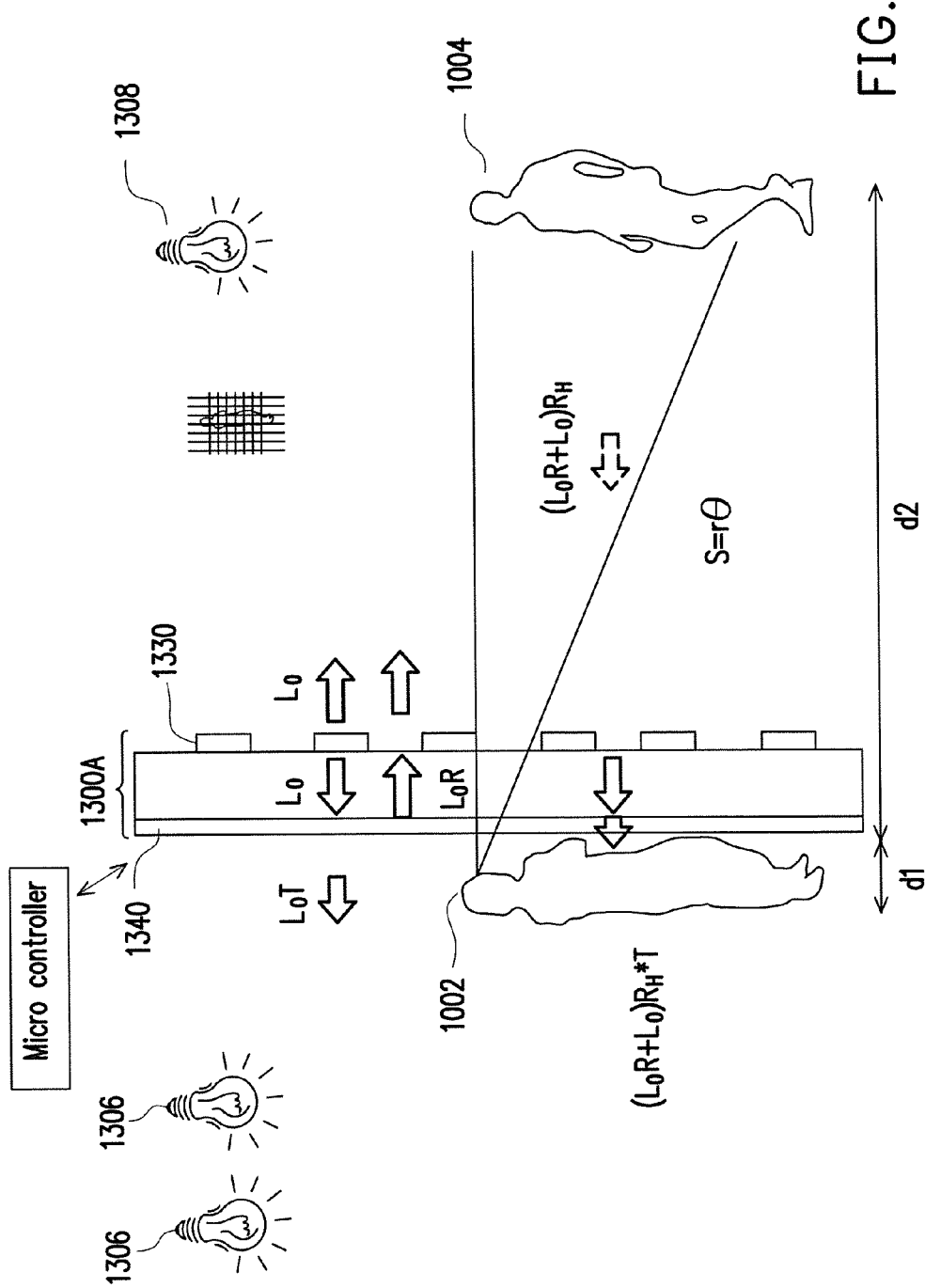
FIG. 13A and FIG. 13B schematically illustrate an use of decodable light and an use of both decodable light and light blocking layer in the ALA apparatus depicted in FIG. 12D, respectively.
Figure 13B:
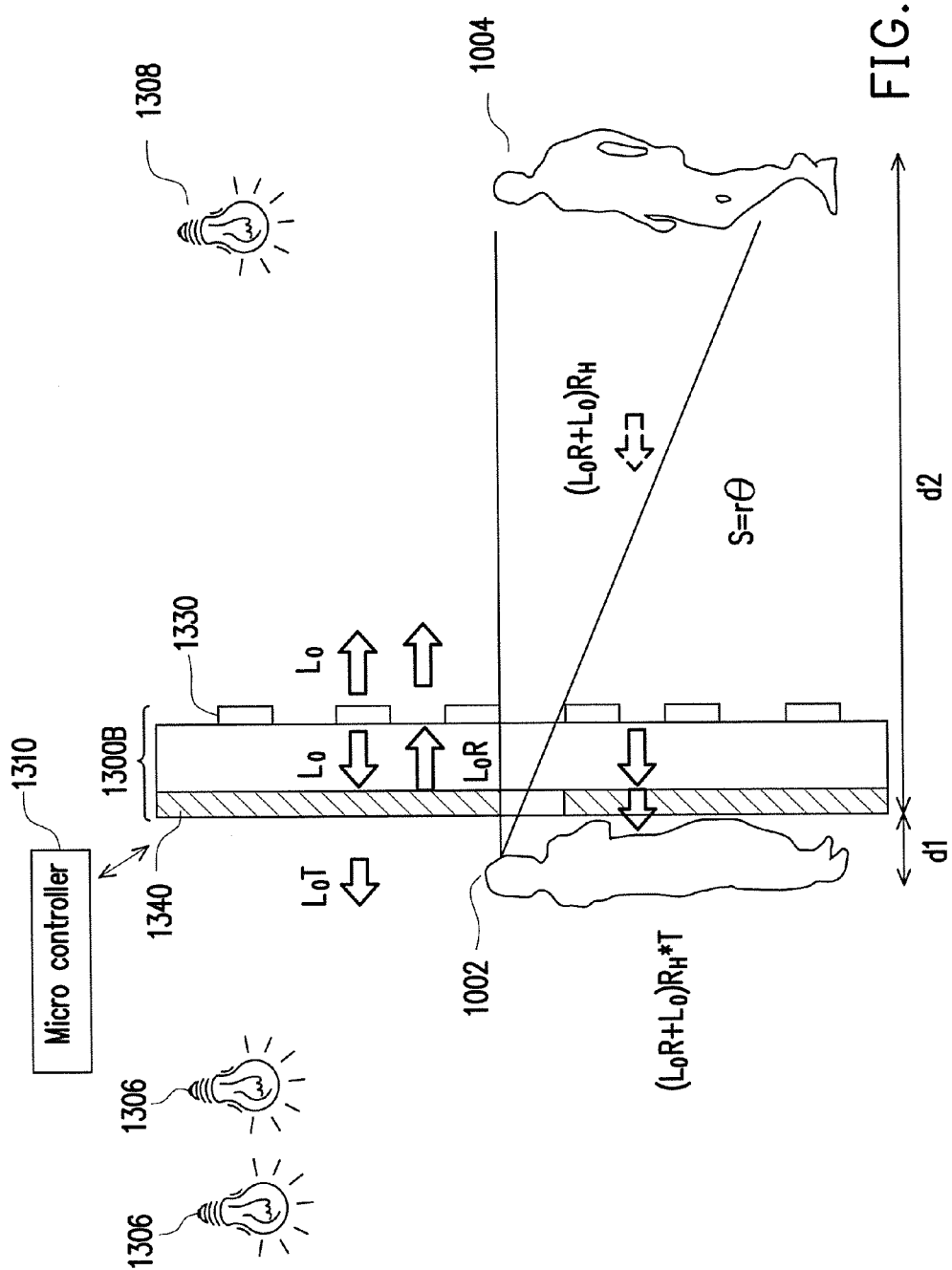

More specifically, FIG. 13A and FIG. 13B schematically illustrate an use of decodable light and an use of both decodable light and light blocking layer in the ALA apparatus depicted in FIG. 12D, respectively. Here, the ALA apparatus 1200D depicted in FIG. 12D is employed for illustration, in which the main body is sandwiched in between two light blocking layers 1330 and 1340, although the disclosure is not limited thereto.

Referring to FIG. 13A, one of the light blocking layers (e.g. 1330) is partially adjusted with the light blockage levels thereon through the micro controller 1310, in which the pre-set pattern of the light blocking layer 1330 may be arranged as one of depicted in FIG. 4A through FIG. 4D. For the illustration purpose, the pre-set pattern of the light blocking layer 1330 may be arranged as one area having high transmittance (such as, a transparent area) and one area having high reflection (such as, a block area) cross-sectionally, as shown in FIG. 13A.

In the embodiment, the indoor position 1002 is close to the ALA apparatus 1300A, and the outdoor position 1004 is further away from the ALA apparatus 1300A. For example, the distance d1 between the indoor position 1002 and the ALA apparatus 1300A is between 0.1 m and 0.3 m, while the distance d2 between the outdoor position 1004 and the ALA apparatus 1300A is between 3 m and 5 m. On the other hand, the light blocking layer 1340 may be entirely adjusted with the light blockage levels thereon through the micro controller 1310 to be totally transparent. Besides, the indoor environment includes at least two indoor light sources 1306 and the outdoor environment includes an outdoor light source 1308. The quantity of the indoor light sources 1306 is not limited to the embodiment, as long as the indoor environment is brighter than the indoor environment.

Under such configuration of the ALA apparatus 1300A, the person at the indoor position 1002 is able to see the outdoor environment through one transparent area of the light blocking layer 1330. However, the person at the outdoor position 1004 is vaguely able to see the profile of the person at the indoor position 1002 through the transparent area of the light blocking layer 1330 due to the view angle and the distance between the outdoor position 1004 and the ALA apparatus 1300A. In other words, the outdoor person may see the indoor person as a profile image with a mask thereon in the condition that the indoor environment is brighter than the indoor environment, thereby improving the privacy of the indoor environment.

Referring to FIG. 13B, similar to the embodiment depicted in FIG. 13A, the difference between the two embodiments is that the light blocking layers 1330 and 1340 of the ALA apparatus 1300B are both partially adjusted with the light blockage levels thereon through the micro controller 1310, in which the pre-set patterns of the light blocking layers 1330 and 1340 may be respectively arranged as one of depicted in FIG. 4A through FIG. 4D, where the selected pre-set patterns may be different to each other. For the illustration purpose, the pre-set patterns of the light blocking layers 1330 and 1340 may be respectively arranged as one area having high transmittance (such as, a transparent area) and one area having high reflection (such as, a block area), in which the transparent areas of the light blocking layers 1330 and 1340 are not aligned with each other.

Under such configuration of the ALA apparatus 1300B, the person at the indoor position 1002 remains the ability to see the outdoor environment through the transparent areas of the light blocking layers 1330 and 1340. However, in this case, the person at the outdoor position 1004 due to the view angle is incapable of seeing the indoor environment through the transparent areas of the light blocking layers 1330 and 1340. In other words, the outdoor person is unable to see the indoor environment through the uses of decodable light and light blocking of the ALA apparatus 1300B, in the condition that the indoor environment is brighter than the indoor environment, thereby further enhancing the privacy of the indoor environment.

Figure 14:
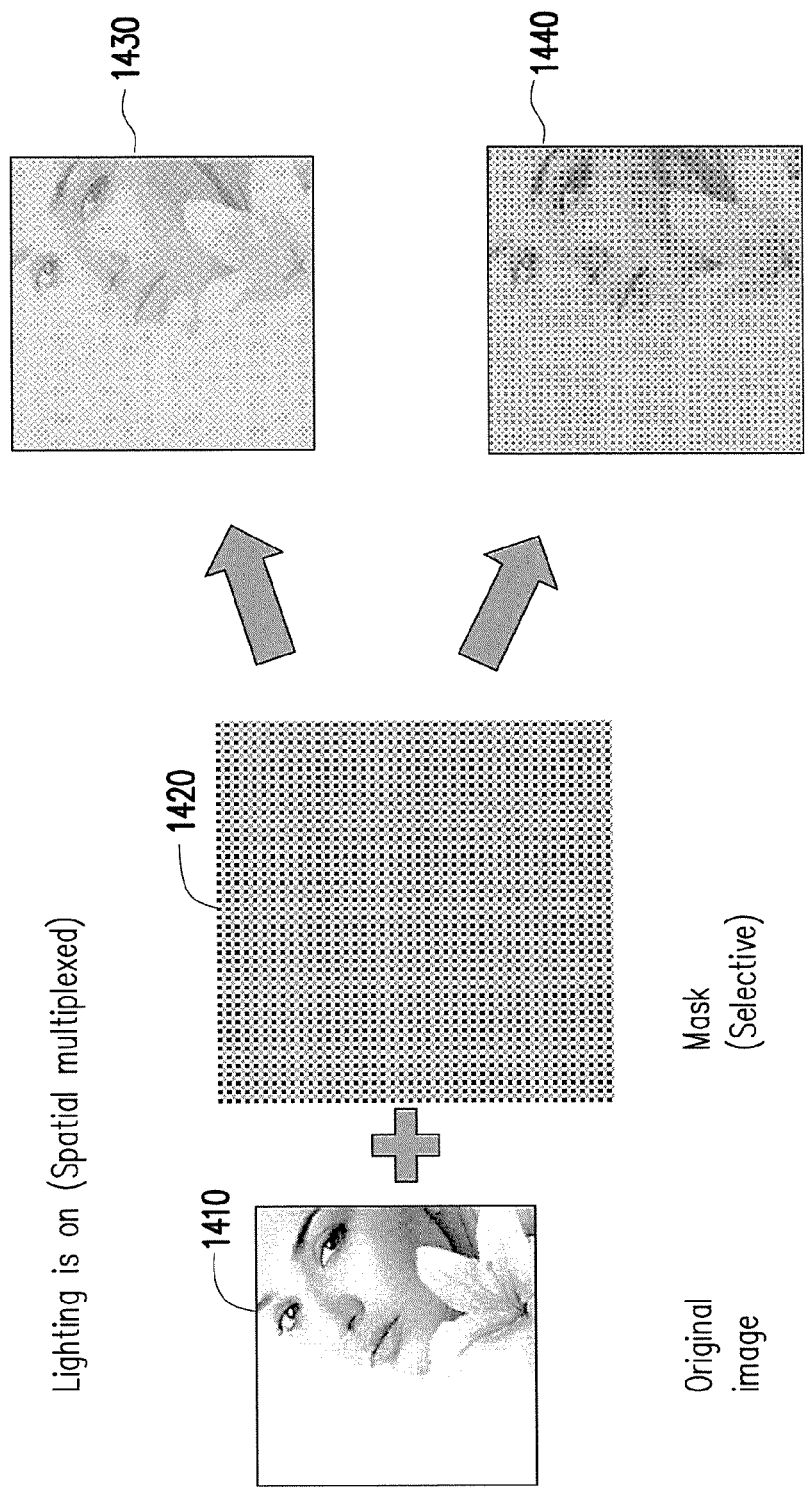
FIG. 14 schematically illustrates a blocking view example with a spatial multiplexed manner by using one mask in an ALA apparatus of one of exemplary embodiments of the disclosure.

Please refer to FIG. 14, which schematically illustrates a blocking view example with a spatial multiplexed manner by using one mask in an ALA apparatus of one of exemplary embodiments of the disclosure. In one embodiment, a light blocking layer in the ALA apparatus or in the system is partially or entirely adjusted with the light blockage levels for blocking the view between the indoor position and the outdoor position manually or automatically under the control by the controller. For example, an original image 1410 in the indoor position will be blocked by the spatial multiplexed manner through the mask 1420 and then became two different images 1430 and 1440 from different view angles in the outdoor position.

Figure 15:
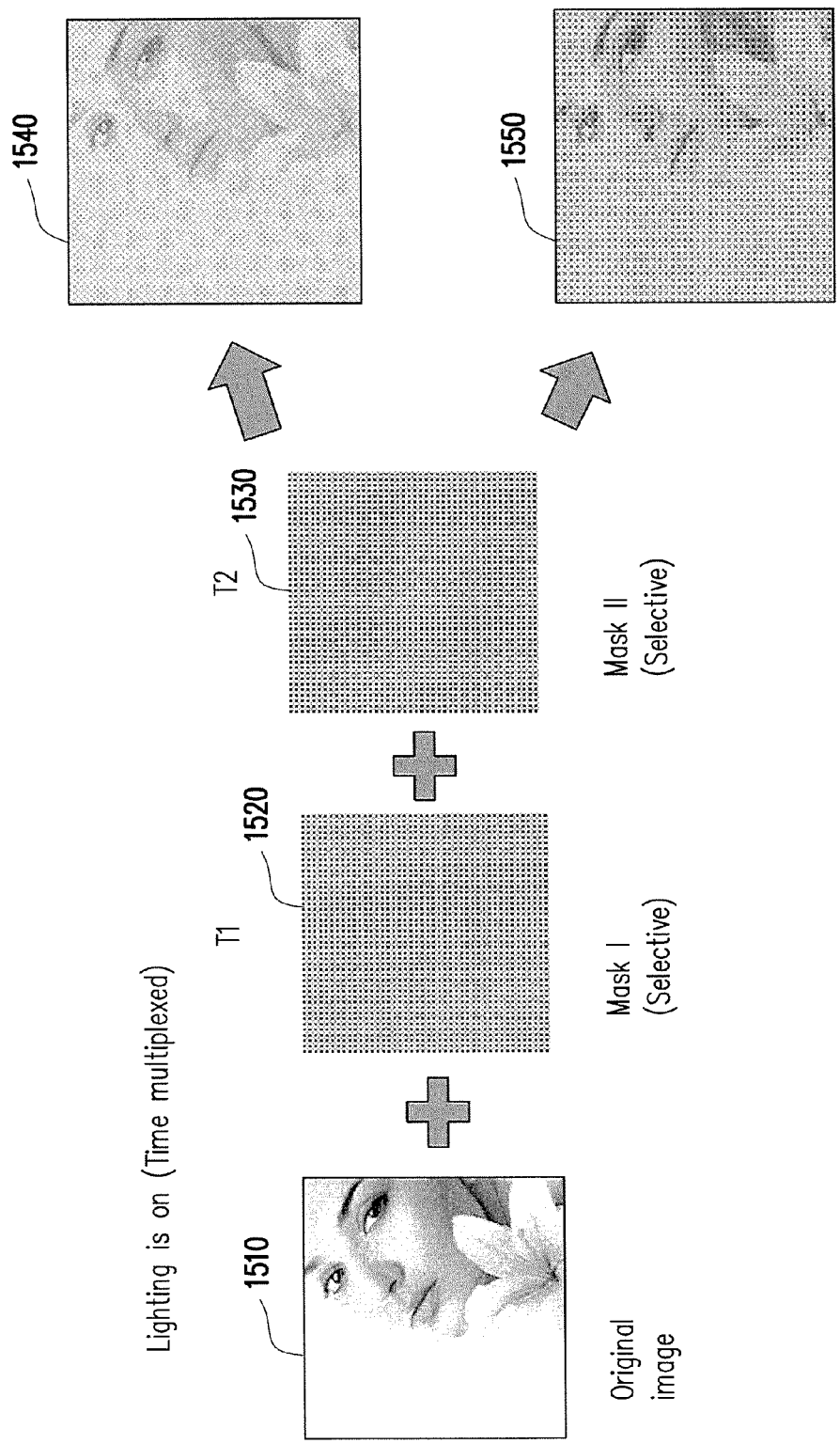
FIG. 15 schematically illustrates a blocking view example with a time multiplexed manner by using two masks in an ALA apparatus of one of exemplary embodiments of the disclosure.

Please refer to FIG. 15, which schematically illustrates a blocking view example with a time multiplexed manner by using two masks in an ALA apparatus of one of exemplary embodiments of the disclosure. In one embodiment, a light blocking layer in the ALA apparatus or in the system is partially or entirely adjusted with the light blockage levels for blocking the view between the indoor position and the outdoor position manually or automatically under the control by the controller. For example, an original image 1510 in the indoor position will be blocked by the time multiplexed manner through two masks 1520, 1530 and then became two different images 1540 and 1550 from different view angles in the outdoor position.

Figure 16:
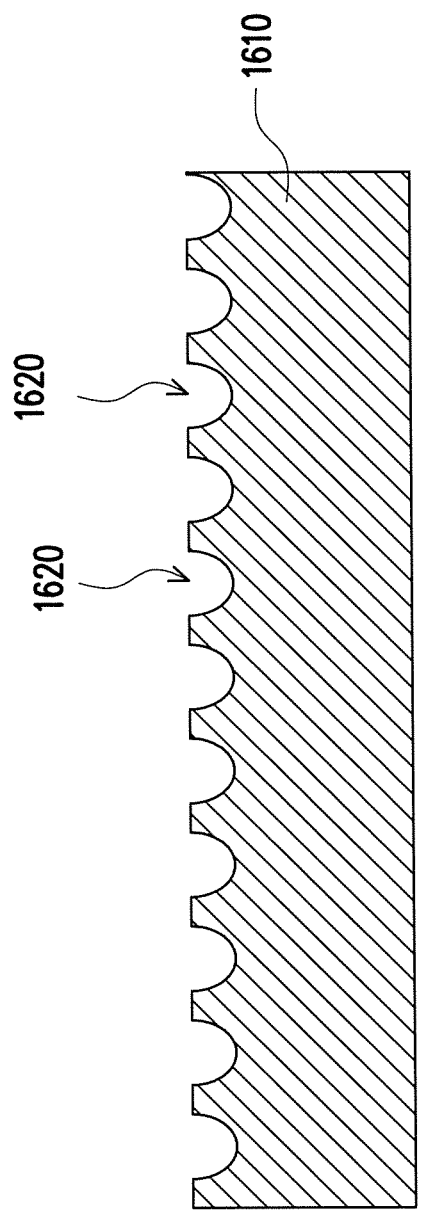
FIG. 16, FIG. 17A, FIG. 17B and FIG. 18 schematically illustrate a plurality of methods of adjusting an refractive index of a light guide plate in an ALA apparatus of one of exemplary embodiments of the disclosure.
Figure 17A:
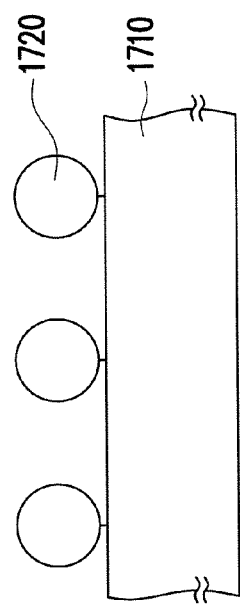
Figure 17B:
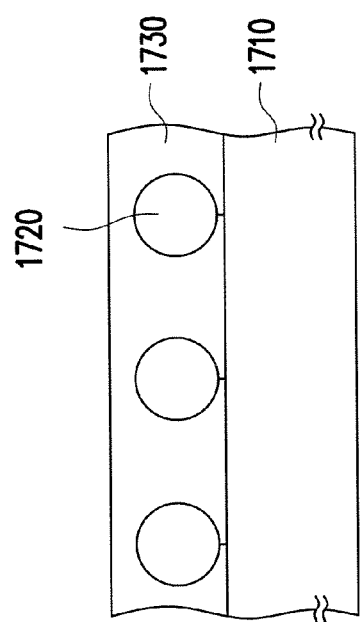
Figure 18:
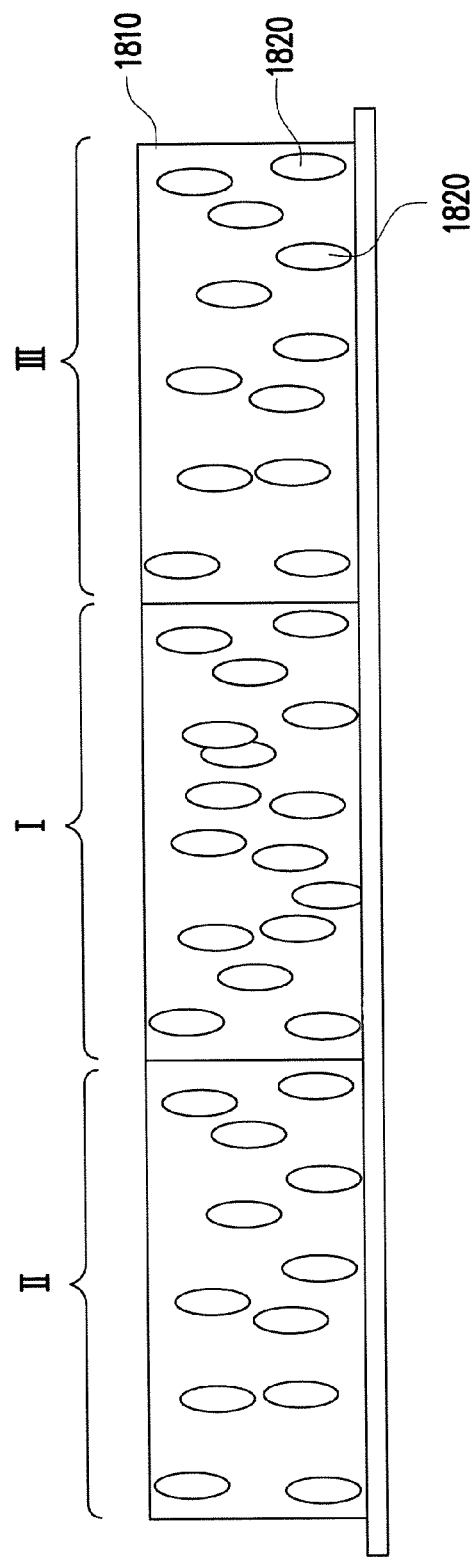

Please refer to FIG. 16-FIG. 18, which schematically illustrate a plurality of methods of adjusting an refractive index of a light guide plate in an ALA apparatus of one of exemplary embodiments of the disclosure. In one embodiment, the light guide plate is embedded or imprinted with light diffusible particles to have a desired refractive index. The refractive index of light guide plate may be in a range from about 1.2 to about 2.5. The size of the diffusible particles is in a range from about 0.1 um to about 2 um. The materials of light diffusable particles are selected from the group consisting of $SiO_2$, SiO, $TiO_2$, $ZrO_2$, $Al_2O_3$, ZnS, $Si_3N_4$, $MgF_2$, or combination thereof.

Please refer to FIG. 16, a physical method may be provided to improve the refractive index of the light guide plate. In the physical method, the light guide plate may be processed by using plasma materials, and a plurality of micro structures 1620 are formed after using the ions bombing on the surface of the light guide plate 1610. The plurality of micro structures 1620 may fix the Nano-sized light diffusible particles disposed therein. The refractive index of a light guide plate by using the micro structure 1620 may provide the refractive index with a normal distribution or a Gaussian distribution.

Please refer to FIG. 17A and FIG. 17B, a self-assembly monolayer (SAMs) 1710 with a pre-determined pattern is formed on a surface of a light guide plate. The SAMs 1710 may be manufactured by using physical vapor deposition techniques, electrodeposition or electroless deposition. The SAMs 1710 are useful in depositing nanostructures, because each adsorbate molecules 1720 thereon can be tailored to attract materials such as particular nanoparticles. The functional groups using in the SAMs 1710 may be thiol, N-hydroxy succinimide (NHS) group, amino group, aldehyde group, epoxy group, carboxyl group, hydroxyl group, acyl group, acetyl group, hydrazono, hydrophobic group, thiol group, photoreactive group, cysteine group, disulfide group, alkyl halide group, acyl halide group, azide group, phosphate group, or combination thereof.

Please refer to FIG. 18, a method of using a matrix with particles implanted therein to improve the refractive index of the light guide plate is provided herein. A plurality of areas (I) desired to be implanted or mixed with more particles is pasted first and then a plurality of areas (II and III) on the desired to be implanted or mixed with less particles is pasted thereafter. The light guide plate is pre-baked. A thermal-curing process is performed on the light guide plate.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An Ambient light adjustment (ALA) apparatus, comprising:
    a main body, having a plurality of edges, a first surface and a second surface opposing to the first surface, wherein the main body comprises a light guide plate;
    at least one light source, mounted on at least one edge of the main body, wherein the light guide plate receives a side light from the at least one light source and guides the side light into a planar light emitted from the light guide plate;
    a first light blocking layer, disposed over the first surface of the main body;
    a controller, coupled to the light source and the first light blocking layer, the controller controlling light characteristics of the light source and light blockage levels of the first light blocking layer to adjust ambient light characteristics; and
    a second light blocking layer disposed over the second surface of the main body,
    wherein at least one of the first light blocking layer and the second light blocking layer having a plurality of controllable blocking areas is a decodable light blocking layer for programming spaces, frequencies and degrees of light blockage.

2. The ambient light adjustment apparatus of claim 1, wherein the light guide plate has a first surface and a second surface.

3. The ambient light adjustment apparatus of claim 2, wherein the material of the light guide plate comprises acrylic resin, polycarbonate, epoxy, or glass.

4. The ambient light adjustment apparatus of claim 2, wherein the main body further comprises at least one diffusion layer formed on the first surface of the light guide plate.

5. The ambient light adjustment apparatus of claim 4, wherein the diffusion layer is selected from one of the group consisting of a self-assembled monolayer, a particle-embedded layer, a micro-machined structure layer and a printed dot-pattern layer.

6. The ambient light adjustment apparatus of claim 2, wherein the light guide plate is embedded or imprinted with light diffusible particles.

7. The ambient light adjustment apparatus of claim 1, wherein the first light blocking layer and the second light blocking layer are electro-chromatic layers or electro-wetting layers.

8. The ambient light adjustment apparatus of claim 1, wherein the first and second light blocking layers are selected from the group consisting of an electro-chromatic layer and an electro-wetting layer.

9. The ambient light adjustment apparatus of claim 1, wherein a third light blocking layer is forming on the second surface of the main body.

10. The ambient light adjustment apparatus of claim 1, further comprising:
    a sensor, coupled to the controller, wherein the controller controlling the light characteristics of the light source and/or the light blockage levels of the first light blocking layer according to a sensed result by the sensor.

11. The ambient light adjustment apparatus of claim 10, wherein the sensor comprises a plurality of multiple spectrum sensing units.

12. The ambient light adjustment apparatus of claim 1, wherein the controller further integrated with a sensor, wherein the controller controlling the light characteristics of the light source and/or the light blockage levels of the first light blocking layer according to a sensed result by the sensor.

13. The ambient light adjustment apparatus of claim 12, wherein the sensor comprises a plurality of multiple spectrum sensing units.

14. The ambient light adjustment apparatus of claim 1, wherein the light characteristics comprise light intensity and light color temperature.

15. The ambient light adjustment apparatus of claim 1, wherein the light source comprises a plurality of multiple spectrum light sources.

16. The ambient light adjustment apparatus of claim 1, further comprising a second main body having a plurality of edges, a first surface and an second surface opposing to the first surface, wherein the second main body, dispose on a surface of the first light blocking layer opposing to another surface of the first light blocking layer facing the main body, wherein at least one of the light sources mounted on at least one edge of the second main body.

17. The ambient light adjustment apparatus of claim 16, wherein the second main body comprises a second light guide plate with a first and a second surface.

18. The ambient light adjustment apparatus of claim 17, wherein the second main body further comprises at least one diffusion layer formed on the second surface of the second light guide plate.

19. A method for the ambient light adjustment apparatus as claimed in claim 1 to adjust indoor ambient light characteristics, the method comprising:
    sensing indoor light characteristics;
    comparing the sensed indoor light characteristics with a pre-set threshold; and
    adjusting the indoor ambient light characteristics based on the at least one pre-set threshold by performing at least one of the following steps:
        adjusting a degree of blockage of the first and second light blocking layers;
        adjusting light characteristics of the light source; and
        adjusting light characteristics of an indoor light source.

20. An transparent ambient light adjustment (ALA) apparatus, comprising:
    a main body having a plurality of edges, a first surface and an opposing second surface, wherein the main body comprises a light guide plate;
    at least one light source mounted on at least one edge of the main body, wherein the light guide plate receives a side light from the at least one light source and guides the side light into a planar light emitted from the light guide plate;

a first light blocking layer formed on the first surface of the main body;

a second light blocking layer formed on the second surface of the main body;

a sensor; and a controller coupled to the sensor, the main body, the light source and the light blocking layer, the controller controlling ambient light characteristics by controlling the at least one light source and by adjusting light transmittance ratio and reflection ratio of the main body and the light blocking layer in response to a sensed result of the sensor, wherein the light transmittance ratio is ranged from 95% to 0%, and the reflection ratio is ranged from 5% to 100%, wherein at least one of the first light blocking layer and the second light blocking layer having a plurality of controllable blocking areas is a decodable light blocking layer for programming spaces, frequencies and degrees of light blockage.

21. The transparent ambient light adjustment apparatus of claim 20, wherein the light guide plate having a first surface and a second surface is attached on the main body spatially.

22. A system for adjusting indoor ambient light characteristics, the system comprising:

an indoor ambient light adjustment (ALA) apparatus comprising:

a main body, having a plurality of edges, a first surface and a second surface opposing to the first surface, wherein the main body comprises a light guide plate;

at least one light source, mounted on at least one edge of the main body, wherein the light guide plate receives a side light from the at least one light source and guides the side light into a planar light emitted from the light guide plate;

a first light blocking layer, disposed over the first surface of the main body;

a second light blocking layer, disposed over the second surface of the main body;

a controller, coupled to the light source and the first light blocking layer and the second light blocking layer; and an outdoor sensor and an indoor sensor for sensing the ambient light characteristics and sending sensed results to the controller, wherein the controller is programmed with at least one pre-set threshold, and the controller adjusts light characteristics of the light source and light blockage levels of the first and second light blocking layers based on the pre-set threshold and the sensed results by the outdoor sensor and the indoor sensor, wherein the first light blocking layer and the second light blocking layer are programmed for displaying a pre-set pattern to have a transmittance and a reflectance based on the sensed results by the outdoor sensor and the indoor sensor, so to have a capability to function as an one-way mirror for the ALA apparatus.

23. The system for adjusting ambient light characteristics of claim 22, wherein the controller is further coupled to at least one indoor light source for adjusting indoor ambient light characteristics.

24. The system for adjusting indoor ambient light characteristics of claim 22, wherein the controller further comprises at least one memory unit and/or at least one processor unit.

25. The system for adjusting indoor ambient light characteristics of claim 22, wherein the ambient light adjustment apparatus further comprises a receiver coupling to the controller and a remote control, wherein the remote control transmitting commands to the controller via the receiver.

26. The system for adjusting indoor ambient light characteristics of claim 25, wherein the remote control further comprises:

power supply means for supplying power to the remote control;

keyboard means for inputting system control commands;

control means coupled to the keyboard means and the power supply means for accepting the system control commands and outputting a series of system control signals; and transmitter means coupled to the control means and the power supply means for transmitting the control signals to the system.

27. The system for adjusting indoor ambient light characteristics of claim 22, wherein the first and second light blocking layers are partially or entirely adjusted with the light blockage levels for blocking the view between an indoor position and an outdoor position.

28. The system for adjusting indoor ambient light characteristics of claim 27, wherein the first and second light blocking layers are manually or automatically adjusted through the controller.

29. The system for adjusting indoor ambient light characteristics of claim 28, further comprises at least one indoor light source to enhance the indoor ambient light characteristics.

30. The system for adjusting indoor ambient light characteristics of claim 22, further comprising one or more programs, the one or more programs being stored in a memory unit and configured to be executed by the controller for conducting:

sensing indoor light characteristics;

comparing the sensed indoor light characteristics with a preset threshold;

adjusting indoor light characteristics based on the comparison; and conducting at least one of following steps:

tuning the blockage of the first and second light blocking layers;

adjusting the light characteristics of the light source; and adjusting indoor light characteristics.

* * * * *